US010216469B2

(12) United States Patent
Kang et al.

(10) Patent No.: US 10,216,469 B2
(45) Date of Patent: Feb. 26, 2019

(54) ELECTRONIC DEVICE FOR DISPLAYING SCREEN ACCORDING TO USER ORIENTATION AND CONTROL METHOD THEREOF

(71) Applicant: Samsung Electronics Co., Ltd., Gyeonggi-do (KR)

(72) Inventors: Ran Kang, Gyeonggi-do (KR); Nam-Hoi Kim, Gyeonggi-do (KR); Seong-Woong Park, Seoul (KR); Do-Hyung Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/088,435

(22) Filed: Apr. 1, 2016

(65) Prior Publication Data

US 2016/0313963 A1 Oct. 27, 2016

(30) Foreign Application Priority Data

Apr. 21, 2015 (KR) ........................ 10-2015-0056057

(51) Int. Cl.
| | |
|---|---|
| *G06F 3/14* | (2006.01) |
| *G06F 3/0488* | (2013.01) |
| *G06F 1/16* | (2006.01) |
| *H04M 1/725* | (2006.01) |
| *G06F 3/01* | (2006.01) |

(Continued)

(52) U.S. Cl.
CPC .......... *G06F 3/1423* (2013.01); *G06F 1/1637* (2013.01); *G06F 1/1647* (2013.01); *G06F 1/1649* (2013.01); *G06F 3/011* (2013.01); *G06F 3/0416* (2013.01); *G06F 3/0488* (2013.01); *G06F 3/04883* (2013.01); *G06F 3/16* (2013.01); *H04M 1/72519* (2013.01); *H04W 4/02* (2013.01); *H04W 64/00* (2013.01); *G06F 2200/1614* (2013.01); *G06F 2200/1637* (2013.01); *H04M 1/0266* (2013.01); *H04M 2250/12* (2013.01); *H04M 2250/16* (2013.01); *H04M 2250/22* (2013.01); *H04M 2250/54* (2013.01)

(58) Field of Classification Search
None
See application file for complete search history.

(56) References Cited

U.S. PATENT DOCUMENTS

| | | | |
|---|---|---|---|
| 8,243,961 B1 * | 8/2012 | Morrill ............... | H04M 1/6041 379/433.03 |
| 2004/0201595 A1 * | 10/2004 | Manchester .......... | G06F 1/1626 345/649 |

(Continued)

FOREIGN PATENT DOCUMENTS

EP 2 196 891 A2 6/2010

OTHER PUBLICATIONS

European Search Report dated Aug. 25, 2016.

*Primary Examiner* — Hilina K Demeter
(74) *Attorney, Agent, or Firm* — Cha + Reiter, LLC.

(57) ABSTRACT

Disclosed is a method of controlling an electronic device. The method may include: acquiring a user's location with respect to the electronic device; and determining a display direction of a screen displayed on the electronic device based on the acquired user's location and displaying a first screen in the determined display direction.

16 Claims, 33 Drawing Sheets

(51) Int. Cl.
*G06F 3/041* (2006.01)
*G06F 3/16* (2006.01)
*H04W 4/02* (2018.01)
*H04W 64/00* (2009.01)
*H04M 1/02* (2006.01)

(56) References Cited

U.S. PATENT DOCUMENTS

| | | | | |
|---|---|---|---|---|
| 2009/0002391 | A1* | 1/2009 | Williamson | G06F 1/1626 345/619 |
| 2009/0322691 | A1* | 12/2009 | Chiu | G06F 1/1626 345/173 |
| 2010/0088639 | A1* | 4/2010 | Yach | G06F 1/1626 715/825 |
| 2011/0264928 | A1* | 10/2011 | Hinckley | G06F 1/1626 713/300 |
| 2012/0017147 | A1* | 1/2012 | Mark | G06F 1/1639 715/702 |
| 2012/0081337 | A1* | 4/2012 | Camp, Jr. | G06F 3/0436 345/177 |
| 2012/0127069 | A1 | 5/2012 | Santhiveeran et al. | |
| 2013/0154947 | A1 | 6/2013 | Abrams et al. | |
| 2013/0321714 | A1* | 12/2013 | Kobayashi | H04N 5/2628 348/738 |
| 2014/0267091 | A1* | 9/2014 | Kim | G06F 1/1652 345/173 |
| 2014/0298246 | A1* | 10/2014 | Wang | G06F 3/0488 715/781 |
| 2014/0300529 | A1 | 10/2014 | Kim et al. | |
| 2014/0306877 | A1* | 10/2014 | Katz | G06F 3/017 345/156 |
| 2014/0306985 | A1 | 10/2014 | Jeong et al. | |
| 2014/0307395 | A1 | 10/2014 | An | |
| 2015/0015511 | A1 | 1/2015 | Kwak et al. | |
| 2015/0026647 | A1* | 1/2015 | Park | G06F 3/0488 715/863 |
| 2015/0123889 | A1* | 5/2015 | Willis | G06F 3/013 345/156 |
| 2015/0192967 | A1* | 7/2015 | Kano | G09G 5/00 345/650 |
| 2015/0261310 | A1* | 9/2015 | Walmsley | G06F 1/1626 345/173 |
| 2016/0109969 | A1* | 4/2016 | Keating | G06F 3/03547 345/173 |

* cited by examiner

ELECTRONIC DEVICE FOR DISPLAYING SCREEN ACCORDING TO USER ORIENTATION AND CONTROL METHOD THEREOF

CLAIM OF PRIORITY

This application claims priority under 35 U.S.C. § 119(a) to Korean Application Serial No. 10-2015-0056057, which was filed in the Korean Intellectual Property Office on Apr. 21, 2015, the entire content of which is hereby incorporated by reference.

TECHNICAL FIELD

The present disclosure relates to an electronic device for displaying a screen and a control method thereof.

BACKGROUND

Mobile terminals that provide wireless communication between users have been developed. According to advancements in technology, wireless terminals now provide many additional specifications beyond a simple phone call. For example, recently, mobile terminals provide additional functions such as an alarm, a Short Messaging Service (SMS), a Multimedia Message Service (MIMS), an E-mail, a game, remote control of short-range communication, an image capturing function using an installed digital camera, a multimedia function for providing audio and video contents, a scheduling function, and other similar functions.

Further, the mobile terminals may download, install, and execute applications which may provide the aforementioned functions or other functions of the mobile terminals. For example, the applications may include a music reproduction application, a video reproduction application, a photo gallery application, a game application, a social networking application, an Internet browsing application, a file management application, a cloud service application, and other similar applications.

The conventional mobile terminal displayed execution screens of various applications on a display. Accordingly, the user may view the execution screens of the applications while carrying the mobile terminal.

SUMMARY

Rotating a screen simply based on, for example, orientation information on the mobile terminal, for example, rotation information does not allows the user to view the mobile terminal while exiting from a predetermined locations. For example, a mobile terminal may be in one orientation. However, rotating the display according to the orientation may not be desirable if the user is not in an expected location.

The present disclosure has been made to solve the above described problem or other problems.

In accordance with an aspect of the present disclosure, a method of controlling an electronic device is provided. The method includes: an operation of acquiring a user's location with respect to the electronic device; and an operation of determining a display direction of a screen displayed on the electronic device based on the acquired user's location and displaying a first screen in the determined display direction.

In accordance with another aspect of the present disclosure, an electronic device is provided. The electronic device includes: a display; a processor electrically connected to the display; and a memory electrically connected to the processor, wherein the memory stores instructions to instruct the processor to acquire a user's location with respect to the electronic device, to determine a display direction of a screen displayed on the electronic device based on the acquired user's location, and to control the display to display a first screen in the determined display direction when the instructions are executed.

Various embodiments of the present disclosure may disclose an electronic device and a method of controlling the same, which determine a display direction of a screen displayed on the electronic device based on a user's location and display the screen in the determined display direction. Accordingly, the user can see a forward direction screen which a manufacturer intends, regardless of a direction in which the user views the electronic device.

According to various embodiments of the present disclosure, the electronic device including a plurality of displays may display a first display screen corresponding to the user's location. Accordingly, power consumed by the remaining displays except for the first display can be saved.

According to various embodiments of the present disclosure, at least one of a configuration and an output level of the screen displayed on the electronic device can be controlled based on a distance between the user and the electronic device. Accordingly, the electronic device can be adaptively controlled according to the distance between the user and the electronic device.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
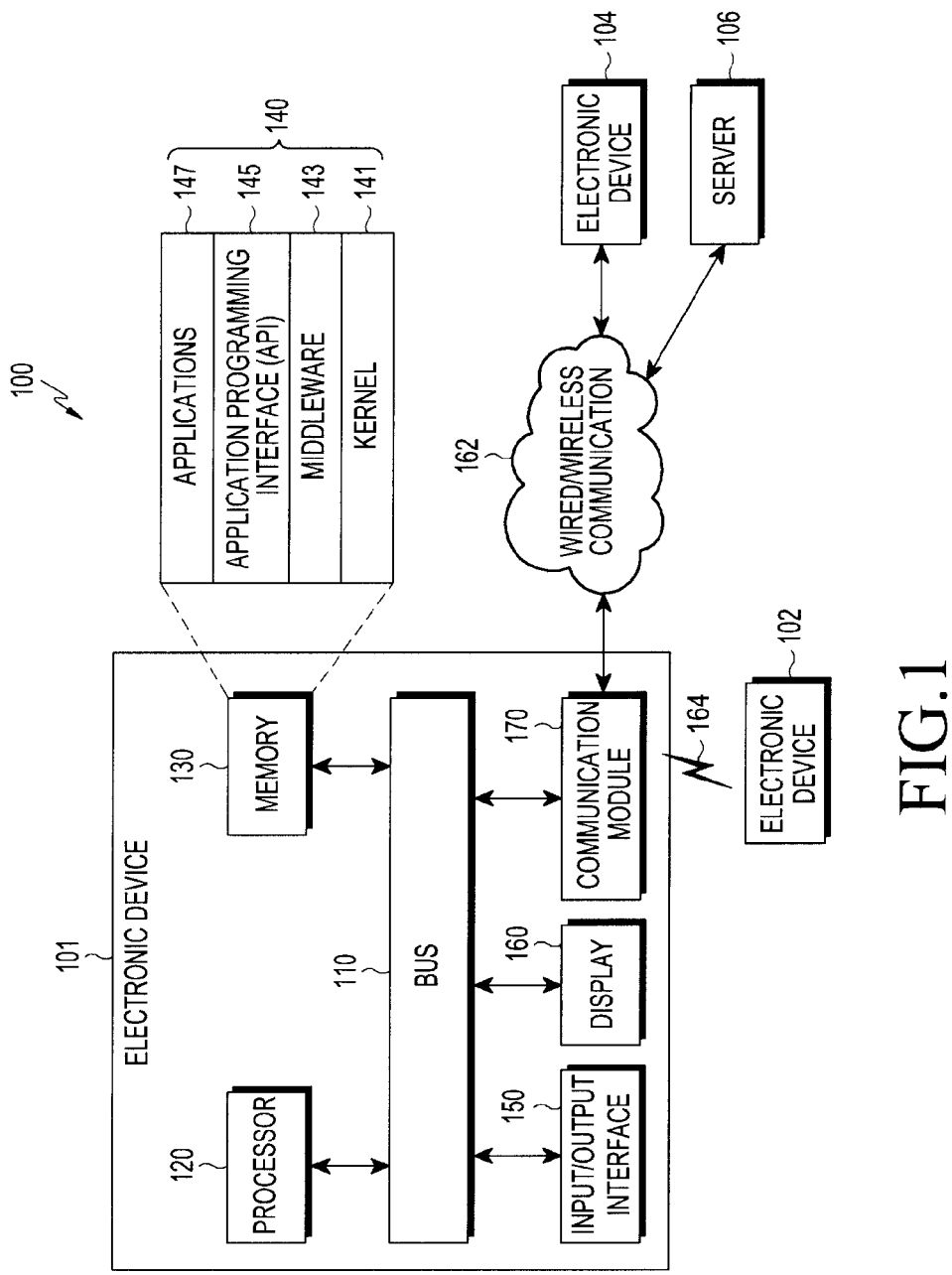
FIG. 1 is a block diagram of an electronic device and a network according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Figure 2:
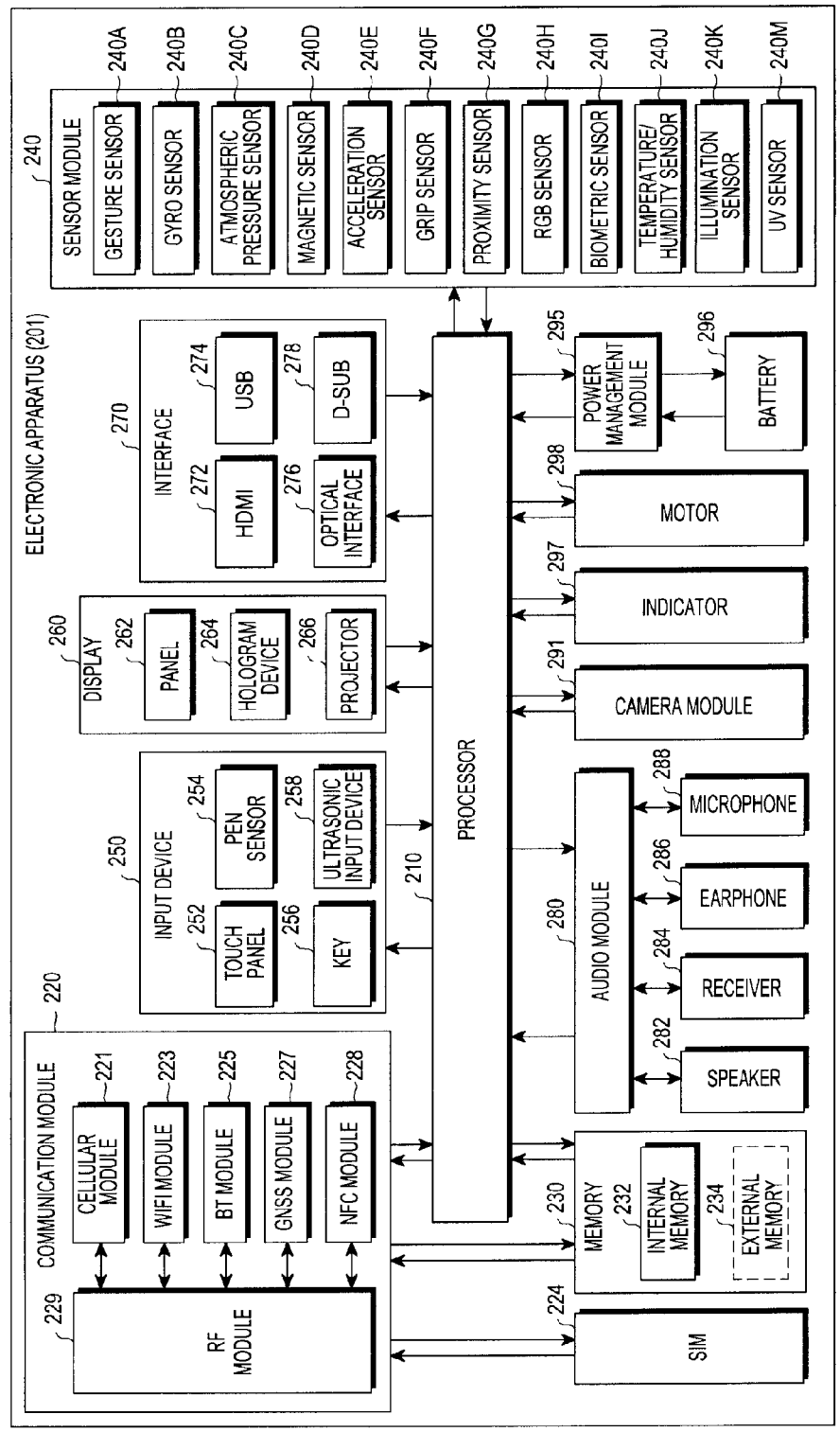
FIG. 2 is a block diagram of the electronic device according to various embodiments of the present disclosure.
Figure 3:
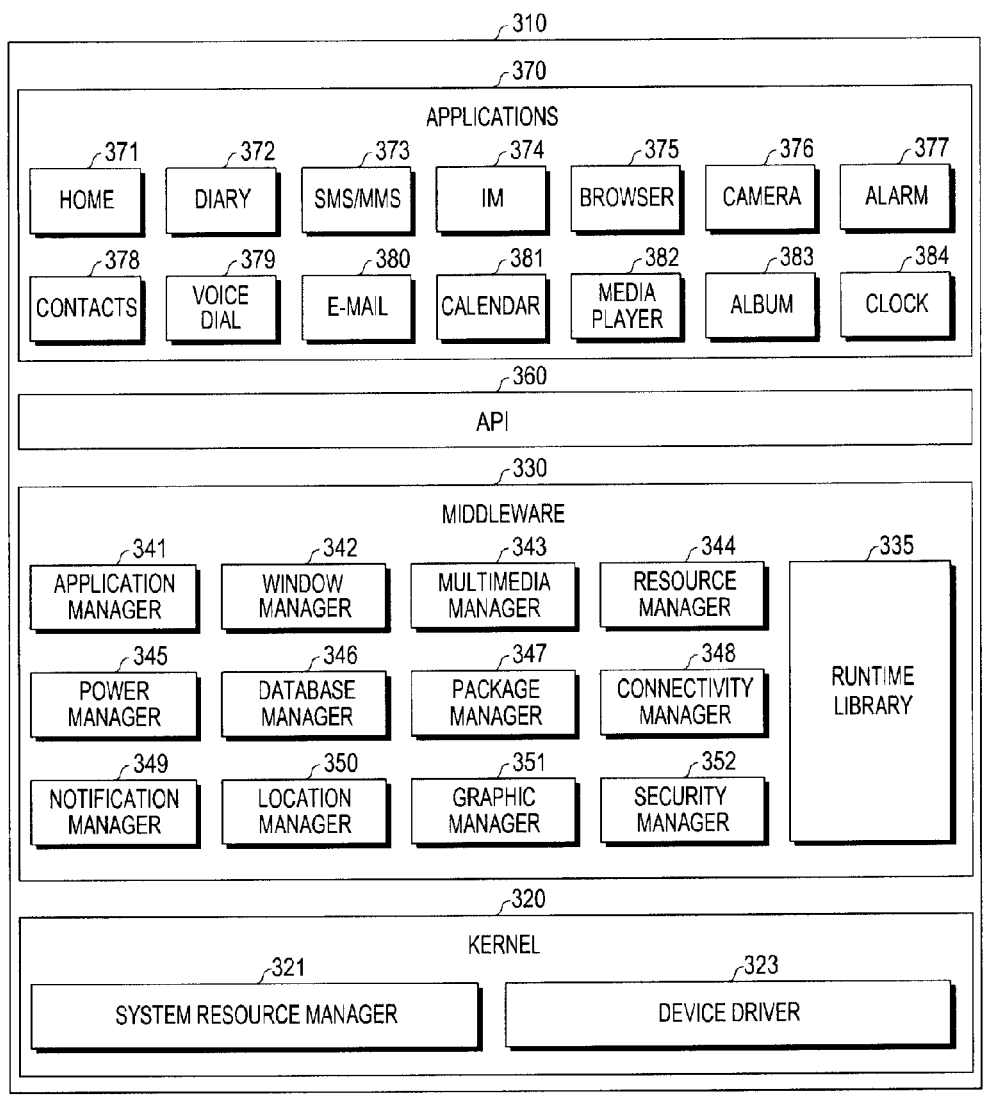
FIG. 3 is a block diagram of a program module according to various embodiments of the present disclosure.

According to various embodiments of the present disclosure, an electronic device displays a screen based on the user's relative location to the electronic device. The electronic device determines the user's location relative to the electronic device and determines a display direction of the screen that is most suitable, based on the user's location relative to the electronic device. FIG. 1-3 describe an electronic device according to various embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

An electronic device 101 within a network environment 100, according to various embodiments, will be described with reference to FIG. 1. The electronic device 101 may include a bus 110, a processor 120, a memory 130, an input/output interface 150, a display 160, and a communication module 170. In some embodiments, the electronic device 101 may omit at least one of the above elements or may further include other elements.

The bus 110 may include, for example, a circuit for interconnecting the elements 110 to 170 and transferring communication (for example, control messages and/or data) between the elements.

The processor 120 may include one or more of a Central Processing Unit (CPU), an Application Processor (AP), and a Communication Processor (CP). For example, the processor 120 may carry out operations or data processing related to control and/or communication of at least one other component of the electronic device 101.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage, for example, system resources (for example, the bus 110, the processor 120, or the memory 130) used for performing an operation or function implemented by the other programs (for example, the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (for example, the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (for example, instruction) for file control, window control, image processing, or text control.

The input/output interface 150 may function as, for example, an interface that may transfer instructions or data input from a user or another external device to the other element(s) of the electronic device 101. Furthermore, the input/output interface 150 may output instructions or data received from the other element(s) of the electronic device 101 to the user or the other external device.

The display 160 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display, for example, various types of contents (for example, text, images, videos, icons, or symbols) for the user. The display 160 may include a touch screen, and may receive, for example, a touch, gesture, proximity, or hovering input by using an electronic pen or a part of the user's body.

The communication module 170 may set communication between, for example, the electronic device 101 and an external device (for example, a first external electronic device 102, a second external electronic device 104, or a server 106). For example, the communication module 170 may be connected to a network 162 through wireless or wired communication to communicate with the external device (for example, the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UNITS), WiBro (Wireless Broadband), and Global System for Mobile Communications (GSM), as a cellular communication protocol. In addition, the wireless communication may include, for example, short range communication 164. The short range communication 164 may include, for example, at least one of Wi-Fi, Bluetooth, Near Field Communication (NFC), Global Navigation Satellite System (GNSS), and the like. The GNSS may include at least one of, for example, a Global Positioning System (GPS), a Global navigation satellite system (Glonass), a Beidou navigation satellite system (hereinafter, referred to as "Beidou"), and Galileo (European global satellite-based navigation system) according to an area in which the GNSS is used or a bandwidth of the GNSS. Hereinafter, in the present disclosure, the term "GPS" may be interchangeably used with the term "GNSS". The wired communication may include, for example, at least one of a Universal Serial Bus (USB), a High Definition Multimedia Interface (HDMI), Recommended Standard 232 (RS-232), and a Plain Old Telephone Service (POTS). The network 162 may include at least one of a communication network such as a computer network (for example, a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments, all or some of the operations performed in the electronic device 101 may be performed in another electronic device or a plurality of electronic devices (for example, the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic device (for example, the electronic device 102 or 104) or the server 106 may execute the requested functions or the additional functions, and may deliver a result of the execution to the electronic device 101. The electronic device 101 may provide the received result as it is or additionally process the received result to provide the requested functions or services. To achieve this, for example, cloud computing, distributed computing, or client-server computing technology may be used.

According to various embodiments of the present disclosure, the processor 120 may be electrically connected to the display 160. Further, the processor 120 may be electrically connected to the memory 130. The memory 130 may store instructions to instruct the processor 120 to acquire a user's position with respect to the electronic device, to determine a display direction of the screen displayed on the electronic device based on the acquired user's position, and to control the display to display a first screen in the determined display direction when the instructions are executed.

According to various embodiments of the present disclosure, microphones (not shown) may be electrically connected to the processor and each of them may detect a voice. The memory 130 may further store instructions to instruct the processor 120 to acquire the user's location according to a detection time difference between the voices detected by the plurality of microphones when the instructions are executed.

According to various embodiments of the present disclosure, a touch panel (not shown) may be electrically connected to the processor and may detect an electric signal corresponding to a touch or proximity on the electronic device. The memory 130 may further store instructions to instruct the processor 120 to acquire the user's location based on the electric signal when the instructions are executed.

According to various embodiments of the present disclosure, the memory 130 may further store instructions to instruct the processor 130 to acquire the user's location based on at least one of a pattern and a location of an area having a strength of the electric signal from the touch panel, which is weaker than a preset threshold when the instructions are executed.

According to various embodiments of the present disclosure, the memory 130 may further store instructions to instruct the processor 130 to acquire the user's location based on at least one of a pattern and a location of an area having a strength of the electric signal from the touch panel, which is weaker than a preset threshold when the instructions are executed.

According to various embodiments of the present disclosure, proximity sensors (not shown) may be electrically connected to the processor and each of them may detect proximity information. The memory 130 may further store instructions to instruct the processor 120 to acquire the user's location according to proximity information detected by each of the plurality of proximity sensors when the instructions are executed.

According to various embodiments of the present disclosure, a transducer (not shown) may generate transmission ultrasonic waves and receive returning ultrasonic waves formed by a reflection of the transmission ultrasonic waves. The memory 130 may further store instructions to instruct the processor 120 to acquire the user's location based on the reflected ultrasonic waves when the instructions are executed.

According to various embodiments of the present disclosure, a camera (not shown) may acquire an image of one side of the electronic device. The memory 130 may further store instructions to instruct the processor 120 to analyze the image and acquire the user's location based on a result of the analysis when the instructions are executed when the instructions are executed.

According to various embodiments of the present disclosure, the memory 130 may further store instructions to instruct the processor 120 to determine a first area to be displayed on the display based on the acquired user's location and to make a control to display the first screen in the first area in the determined display direction when the instructions are executed when the instructions are executed.

According to various embodiments of the present disclosure, a beam projector (not shown) may beam-project a screen and may be electrically connected to the processor 120. The memory 130 electrically connected to the processor may store instructions to instruct the processor 120 to acquire a user's location with respect to the electronic device, to determine a first direction to beam-project a first screen based on the acquired user's location, and to control the beam projector to beam-project the first screen in the determined first direction when the instructions are executed.

According to various embodiments of the present disclosure, the electronic device 101 may include a plurality of displays. The plurality of displays may be displays separated in hardware or separated according to areas on the entire display. The memory 130 may store instructions to instruct the processor 120 to acquire a user's location with respect to the electronic device, to determine a first display to display a first screen among the plurality of displays based on the acquired user's location, and to control the determined first display to display the first screen when the instructions are executed.

According to various embodiments of the present disclosure, the plurality of displays may include: a main display arranged on a front surface of the electronic device 101; a first edge display connected to one side of the main display and formed to be curved; and a second edge display connected to another side of the main display and formed to be curved.

According to various embodiments of the present disclosure, acquiring the user's location comprises determining an angle from a point on the electronic device and a reference.

According to various embodiments of the present disclosure, the memory 130 may further store instructions to instruct the processor 120 to determine a display direction of a first screen based on the user's location and to make a control to display the first screen on a first display in the determined display direction when the instructions are executed.

According to various embodiments of the present disclosure, the electronic device 101 may include an output unit. The output unit may be a concept including hardware which may perform various outputs such as a voice, a screen, a vibration, and the like. The memory 130 may store instructions to instruct the processor 120 to acquire a distance between the electronic device and a user, to determine at least one of a configuration of a screen displayed on the electronic device and an output level based on the acquired distance, and to control the output unit to perform an output based on at least one of the determined configuration of the screen and the determined output level when the instructions are executed.

According to various embodiments of the present disclosure, the memory 130 may store instructions to instruct the processor 120 to acquire a user's location with respect to the electronic device, to determine a display location of at least one object within a screen displayed on the electronic device based on the acquired user's location, and to control the display to display a first screen on which said at least one object is arranged at the determined display location when the instructions are executed.

FIG. 2 is a block diagram of an electronic device 201 according to various embodiments. The electronic device includes a display 260, a processor 210 electrically connected to the display 260, and a memory 230 electrically connected to the processor 210. The memory can store a plurality of instructions to instruction the processor to acquire the electronic device's user's location with respect to the electronic device 201, determine a display direction of a screen displayed on the display 260 based on the user's location, and control the display to display a first screen in the determined display direction.

The electronic device 201 may include, for example, the whole or part of the electronic device 101 illustrated in FIG. 1. The electronic device 201 may include at least one Application Processor (AP) 210, a communication module 220, a subscriber identification module 224, the memory 230, a sensor module 240, an input device 250, the display 260, an interface 270, an audio module 280, a camera module 291, a power management module 295, a battery 296, an indicator 297, and a motor 298.

The processor 210 may control a plurality of hardware or software elements connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor. The processor 210 may include at least some (for example, a cellular module 221) of the elements illustrated in FIG. 2. The processor 210 may load, into a volatile memory, instructions or data received from at least one (for example, a non-volatile memory) of the other elements and may process the loaded instructions or data, and may store various data in a non-volatile memory.

The communication module 220 may have a configuration equal or similar to that of the communication interface 170 of FIG. 1. The communication module 220 may include, for example, a cellular module 221, a Wi-Fi module 223, a Bluetooth module 225, a GNSS module 227 (for example, a GPS module, a Glonass module, a Beidou module, or a Galileo module), an NFC module 228, and a Radio Frequency (RF) module 229.

The cellular module 221 may provide a voice call, an image call, a text message service, or an Internet service through, for example, a communication network. According to an embodiment, the cellular module 221 may distinguish between and authenticate electronic devices 201 within a communication network using a subscriber identification module (for example, the SIM card 224). According to an exemplary embodiment of the present disclosure, the cellular module 221 may perform at least some of the functions that the processor 210 may provide. According to an embodiment of the present disclosure, the cellular module 221 may include a Communication Processor (CP).

The Wi-Fi module 223, the Bluetooth module 225, the GNSS module 227, or the NFC module 228 may include, for example, a processor that processes data transmitted and received through the corresponding module. According to some embodiments, at least some (two or more) of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (for example, an RF signal). The RF module 229 may include, for example, a transceiver, a Power Amp Module (PAM), a frequency filter, a Low Noise Amplifier (LNA), or an antenna. According to another embodiment of the present disclosure, at least one of the cellular module 221, the Wi-Fi module 223, the BT module 225, the GNSS module 227, and the NFC module 228 may transmit/receive an RF signal through a separate RF module.

The subscriber identification module 224 may include, for example, a card including a subscriber identification module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include at least one of, for example, a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM), a flash memory (for example, a NAND flash memory or a NOR flash memory), a hard driver, or a Solid State Drive (SSD).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some exemplary embodiments of the present disclosure, an electronic device 201 may further include a processor configured to control the sensor module 240 as a part of or separately from the processor 210, and may control the sensor module 240 while the processor 210 is in a sleep state. In certain embodiments, the processor 210 can acquire the user's location based on proximity information provided by a plurality of proximity sensor 240G.

The input device 250 may include, for example, a touch panel 252, a (digital) pen sensor 254, a key 256, and an ultrasonic input device 258. The touch panel 252 may use at least one of, for example, a capacitive scheme, a resistive scheme, an infrared scheme, and an ultrasonic scheme. Further, the touch panel 252 may further include a control circuit. The touch panel 252 may further include a tactile layer and provide a tactile reaction to the user. In certain embodiments, the touch panel detects an electric signal corresponding to a touch or proximity on/to the electronic device 201. The processor 210 can acquire the user's location based on the electric signal.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic wave generated by an input tool through a microphone (for example, the microphone 288) and identify data corresponding to the detected ultrasonic waves. In certain embodiments, the processor 210 uses ultrasonic waves to determine the user's location. The electronic device 201 can generated ultrasonic waves by the speaker 282 that are reflected from the user and received by the microphone 288.

The display 260 (for example, the display 160) may include a panel 262, a hologram device 264 or a projector 266. The panel 262 may include a configuration identical or similar to that of the display 160 illustrated in FIG. 1. The panel 262 may be implemented to be, for example, flexible, transparent, or wearable. The panel 262 and the touch panel 252 may be implemented as one module. The hologram 264 may show a three dimensional image in the air by using an interference of light. The projector 266 may display an image by projecting light onto a screen. The screen may be located, for example, in the interior of or on the exterior of the electronic device 201. According to an embodiment, the display 260 may further include a control circuit for controlling the panel 262, the hologram device 264, or the projector 266. In certain embodiments, the projector 266 can comprise a beam projector. The beam projector can be configured to beam-project a first screen based on the user's location in a first direction determined by the processor 210. Moreover, certain embodiments can comprise a plurality of displays 260 comprising a curved first edge display connected to one side of a main display, and a curved second edge display connected to another side of the main display.

The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some elements of the audio module 280 may be included in, for example, the input/output interface 150 illustrated in FIG. 1. The audio module 280 may process sound information which is input or output through, for example, a speaker 282, a receiver 284, earphones 286, the microphone 288 or the like. Certain embodiments can include a plurality of microphones 288. Each of the plurality of microphones are configured to detect a user's voice. Based on the differences between the detection time by each of the plurality of microphones and the microphone positions on the electronic device 201, the processor 210 can determine the user's position with respect to the electronic device 201.

The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp). In certain embodiments, the camera module can be configured to acquire an image of one side of the electronic device 201. The processor 210 can be configured to analyze the image and acquire the user's location based on the result of the analysis.

The power management module 295 may manage, for example, power of the electronic device 201. According to an embodiment, the power management module 295 may include a Power Management Integrated Circuit (PMIC), a charger Integrated Circuit (IC), or a battery or fuel gauge.

The PMIC may use a wired and/or wireless charging method. Examples of the wireless charging method may include, for example, a magnetic resonance method, a magnetic induction method, an electromagnetic wave method, and the like. Additional circuits (for example, a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may indicate a particular state (for example, a booting state, a message state, a charging state, or the like) of the electronic device 201 or a part (for example, the processor 210) of the electronic device 201. The motor 298 may convert an electrical signal into mechanical vibration, and may generate vibration, a haptic effect, or the like. Although not illustrated, the electronic device 201 may include a processing unit (for example, a GPU) for supporting a mobile television (TV). The processing unit for supporting mobile TV may, for example, process media data according to a certain standard such as Digital Multimedia Broadcasting (DMB), Digital Video Broadcasting (DVB), or mediaFlo™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

FIG. 3 is a block diagram of a program module according to various embodiments. According to an embodiment, the program module 310 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

The program module 310 may include a kernel 320, middleware 330, an Application Programming Interface (API) 360, and/or applications 370. At least some of the program module 310 may be preloaded on the electronic device, or may be downloaded from an external electronic device (for example, the electronic device 102 or 104, or the server 106).

The kernel 320 (for example, the kernel 141) may include, for example, a system resource manager 321 and/or a device driver 323. The system resource manager 321 may control, assign, or collect system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add new functions through a programming language while the applications 370 are executed. The runtime library 335 may perform input/output management, memory management, or a function for an arithmetic function.

The application manager 341 may manage, for example, a life cycle of at least one of the applications 370. The window manager 342 may manage Graphical User Interface (GUI) resources used on a screen. The multimedia manager 343 may identify formats required for the reproduction of various media files and encode or decode a media file using a codec suitable for the corresponding format. The resource manager 344 may manage resources of at least one of the applications 370, such as a source code, a memory, and a storage space.

The power manager 345 may operate together with, for example, a Basic Input/Output System (BIOS) to manage a battery or power and may provide power information required for the operation of the electronic device. The database manager 346 may generate, search, or change a database to be used in at least one of the applications 370. The package manager 347 may manage the installation or the updating of an application distributed in the form of a package file.

The connectivity manager 348 may manage a wireless connection such as, for example, Wi-Fi or Bluetooth. The notification manager 349 may display or notify of an event, such as an arrival message, an appointment, proximity notification, and the like, in such a manner of not disturbing a user. The location manager 350 may manage location information of the electronic device. The graphic manager 351 may manage a graphic effect to be provided to a user and a user interface relating to the graphic effect. The security manager 352 may provide all security functions required for system security or user authentication. According to an exemplary embodiment of the present disclosure, when the electronic device (for example, the electronic device 101) has a telephone call function, the middleware 330 may further include a telephony manager for managing a voice call function or a video call function of the electronic device.

The middleware 330 may include a middleware module that forms combinations of various functions of the above described elements. The middleware 330 may provide specialized modules according to types of operating systems in order to provide differentiated functions. Furthermore, the middleware 330 may dynamically remove some of the existing elements, or may add new elements.

The API 360 (for example, the API 145) is, for example, a set of API programming functions, and may be provided with a different configuration according to an OS. For example, in the case of Android or iOS, one API set may be provided for each platform, and in the case of Tizen, two or more API sets may be provided for each platform.

The applications 370 (for example, the application programs 147) may include, for example, one or more applications that can perform functions, such as home 371, dialer 372, SMS/MMS 373, Instant Message (IM) 374, browser 375, camera 376, alarm 377, contacts 378, voice dial 379, e-mail 380, calendar 381, media player 382, album 383, clock 384, health care (for example, measure exercise quantity or blood sugar), or environment information (for example, atmospheric pressure, humidity, temperature information or the like).

According to an embodiment, the applications 370 may include an application (hereinafter, referred to as an "information exchange application" for convenience of the description) supporting information exchange between the electronic device (for example, the electronic device 101) and an external electronic device (for example, the electronic device 102 or 104). The application associated with exchanging information may include, for example, a notification relay application for notifying an external electronic device of certain information or a device management application for managing an external electronic device.

For example, the notification relay application may include a function of transferring, to the external electronic device (for example, the electronic device 102 or 104), notification information generated from other applications of the electronic device 101 (for example, an SMS/MMS application, an e-mail application, a health management application, or an environmental information application). Further, the notification relay application may receive notification information from, for example, the external electronic device and provide the received notification information to the user.

The device management application may manage (for example, install, delete, or update), for example, at least one function of an external electronic device (for example, the electronic device 102 or 104) communicating with the electronic device (for example, a function of turning on/off the external electronic device itself (or some components) or a function of adjusting luminance (or a resolution) of the display), applications operating in the external electronic device, or services provided by the external electronic device (for example, a call service and a message service).

According to an embodiment, the applications 370 may include applications (for example, a health care application of a mobile medical appliance or the like) designated according to attributes of the external electronic device 102 or 104. According to an embodiment, the applications 370 may include an application received from the external electronic device (for example, the server 106, or the electronic device 102 or 104). According to an embodiment, the applications 370 may include a preloaded application or a third party application which can be downloaded from the server. Names of the elements of the program module 310, according to the above-described embodiments of the present disclosure, may change depending on the type of OS.

According to various exemplary embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 1410). At least some of the program module 310 may include, for example, a module, a program, a routine, a set of instructions, and/or a process for performing one or more functions.

The term "module" as used herein may, for example, mean a unit including one of hardware, memory storing software, and non-volatile memory storing firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

Figure 4:
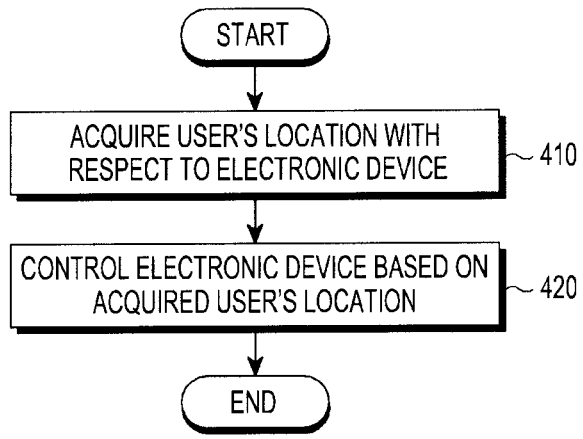
FIG. 4 is flowchart illustrating a control method of the electronic device according to various embodiments of the present disclosure.

FIG. 4 is flowchart illustrating a control method of the electronic device according to various embodiments of the present disclosure.

In operation 410, the electronic device 101 may acquire a user's location with respect to the electronic device 101. The electronic device 101 may acquire the user's location based on one point of the electronic device 101. According to an embodiment, the user's location may include angle information from one point with respect to a reference. The reference can be a plane formed by the electronic device 101, a longitudinal axis or line parallel thereto of the electronic device 101, or a lateral axis or line parallel thereto of the electronic device 101. For example, the user's location according to an embodiment may include an angle in a spherical coordinate system, wherein the angle is formed from a line from the user's location to the one point of the electronic device 101 to a plane defined by the electronic device 101, a longitudinal axis or line parallel thereto of the electronic device 101, or a lateral axis or line parallel thereto of the electronic device 101. According to an embodiment, the user's location may include one of a plurality of areas partitioned based on one point. For example, the electronic device 101 according to various embodiments of the present disclosure may partition an area in advance based on one point as shown in Table 1.

TABLE 1

| Angle | Area |
|---|---|
| 0° to 90° | First area |
| 90° to 180° | Second area |
| 180° to 270° | Third area |
| 270° to 0° | Fourth area |

For example, the angle in Table 1 may be an angle a line segment, which passes through the center on the front surface based on the front surface of the electronic device 101. For example, the angle can be the angle formed from a line at the center of the electronic device 101 and a predetermined corner (such as a corner to the right of a physical button), and a line from center of the device and the user. According to an embodiment, the electronic device 101 may first grasp a user's location and may acquire an area to which the user's location belongs based on Table 1. Meanwhile, the partition of the four areas in Table 1 is only an example, and it may be easily understood by those skilled in the art that there is no limitation in the number of partitioned areas. Further, the partition of the areas based on one angle in Table 1 is only an example, and it may be easily understood by those skilled in the art that the areas can be partitioned additionally based on an angle different from the angle of Table 1. According to various embodiments of the present disclosure, the user's location may be a relative user's location from the electronic device 101, but may be a user's eye location in an embodiment.

According to various embodiments of the present disclosure, the electronic device 101 may acquire the user's location based on a voice detected by each of a plurality of microphones. According to various embodiments of the present disclosure, the electronic device 101 may acquire the user's location based on a measurement signal detected on the touch panel. According to various embodiments of the present disclosure, the electronic device 101 may acquire the user's location based on proximity information detected by a proximity sensor. According to various embodiments of the present disclosure, the electronic device may acquire the user's location based on ultrasonic waves transmitted and received by a transducer. According to various embodiments of the present disclosure, the electronic device 101 may analyze an image of one side of the electronic device 101 and acquire the user's location based on a result of the analysis.

In operation 420, the electronic device 101 may control the electronic device 101 based on the acquired user's location. According to an embodiment, the electronic device 101 may determine a configuration of a displayed screen based on the acquired user's location. According to an embodiment, the electronic device 101 may determine a display direction of the screen based on the acquired user's location and display the screen in the determined display direction. According to an embodiment, the electronic device 101 may determine a location of a particular object within the screen based on the acquired user's location. According to an embodiment, the electronic device 101 may determine a display to display the screen among a plurality of displays based on the acquired user's location. According to an embodiment, the electronic device 101 may determine a beam projector direction based on the acquired user's location and execute the beam projector in the determined direction.

According to various embodiments of the present disclosure, the electronic device 101 may calculate and display a display screen based on the acquired user's location. According to various embodiments of the present disclosure, the electronic device 101 may display a preset screen in accordance with a partitioned area corresponding to the user's location as shown in Table 1. For example, the electronic device 101 may store in advance screen change information as shown in Table 2.

TABLE 2

| Area | Screen change information |
|---|---|
| First area | Display an original screen |
| Second area | Display a screen which is rotated by −90° from the original screen |
| Third area | Display a screen which is rotated by −180° from the original screen |
| Fourth area | Display a screen which is rotated by 90° from the original screen |

According to various embodiments of the present disclosure, the electronic device 101 may configure and display a screen based on correlation information between the user's location and the screen change as shown in Table 2. Meanwhile, the correlation information shown in Table 2 may be changed along with the change in Table 1. Further, although it is described that the screen change information in Table 2 contains only a rotation of the screen, that is, a display direction, it is only an example. According to various embodiments of the present disclosure, the electronic device 101 may store the correlation information between the user's location and various screen configurations such as a beam projector direction, an animation direction, and displayed display information.

Figure 5:
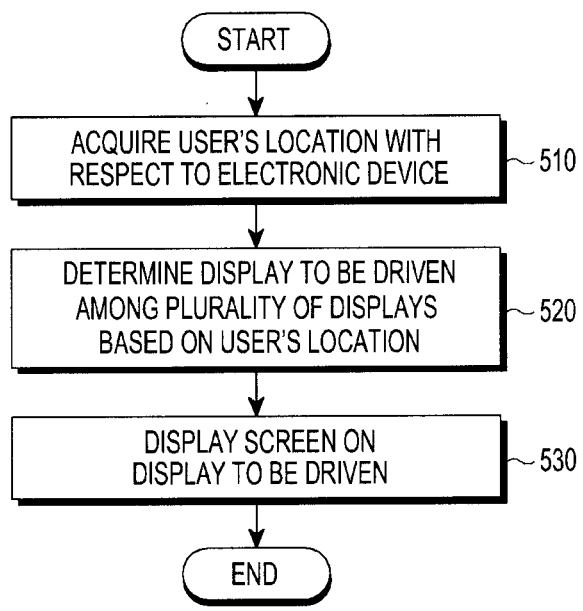
FIG. 5 is flowchart illustrating a control method of the electronic device according to various embodiments of the present disclosure.
Figure 6A:
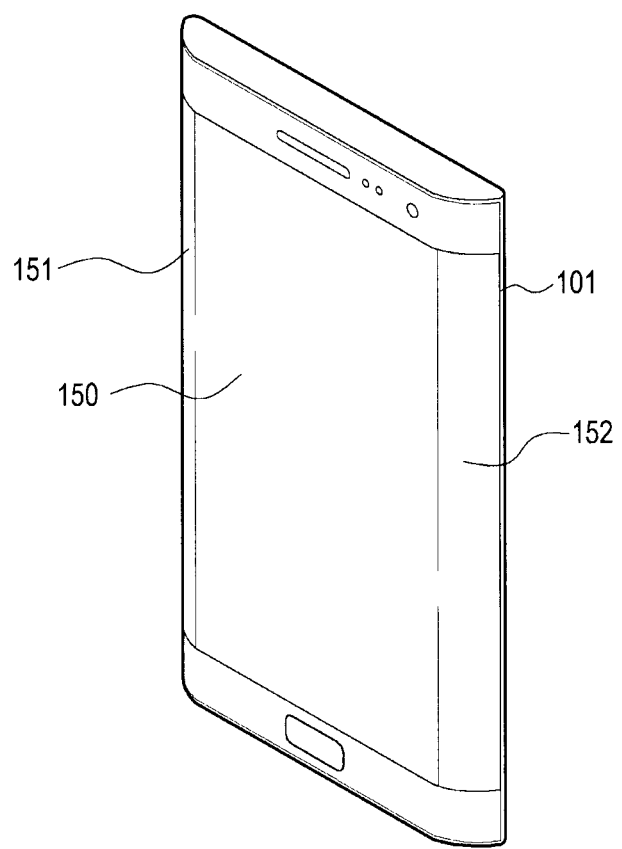
FIG. 6A, FIG. 6B and FIG. 6C are conceptual diagrams of the electronic device according to various embodiments of the present disclosure.
Figure 6B:
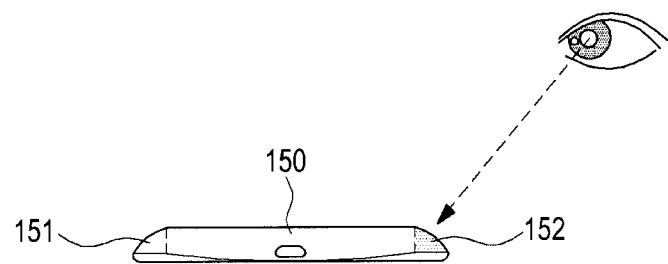
Figure 6C:
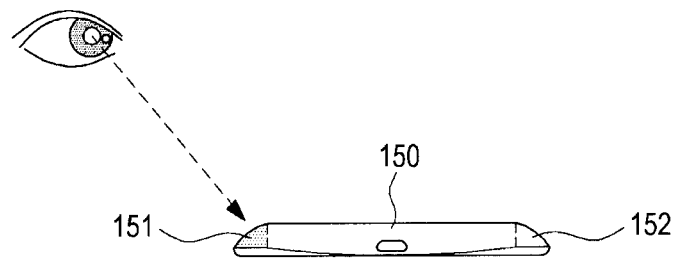

FIG. 5 is flowchart illustrating a control method of the electronic device according to various embodiments of the present disclosure. The embodiment of FIG. 5 will be described in more detail with reference to FIGS. 6A to 6C. FIG. 6A to 6C are conceptual diagrams of the electronic device according to various embodiments of the present disclosure.

In operation 510, the electronic device 101 may acquire a user's location with respect to the electronic device 101. According to various embodiments of the present disclosure, the electronic device 101 may acquire the user's location based on detection information from various devices such as a microphone, a touch panel, a proximity sensor, a camera, and a transducer, which will be described below in more detail.

In operation 520, the electronic device 101 may determine a first display to be driven, that is, to display a screen among a plurality of displays based on the user's location.

FIG. 6A is a conceptual diagram of the electronic device 101 including a plurality of displays 150, 151, and 152 according to various embodiments of the present disclosure. As illustrated in FIG. 6A, the electronic device 101 may include the display 150 arranged on the front surface of the electronic device 101. The display 150 arranged on the front surface may be named a main display. Further, the electronic device 101 may include the first edge display 151 connected to one side of the display 150 and formed to be curved. In addition, the electronic device 101 may display the second edge display 152 connected to another side of the display 150 and formed to be curved. The display 150, the first edge display 151, and the second edge display 152 may be hardware physically separated from each other. Alternatively, the display 150, the first edge display 151, and the second edge display 152 may be displays conceptually partitioned from one display and, in this case, each of the display 150, the first edge display 151, and the second edge display 152 may be named a partial area of the entire display.

Referring to FIG. 6B, it is assumed that the user is positioned relative to the right of the electronic device 101, that is, near the second edge display 152. The electronic device 101 may determine that the user is positioned relatively on the right of the electronic device 101, for example, near the second edge display 152. The electronic device 101 may determine the second edge display 152 as a display to be driven in accordance with the acquired user's location.

Alternatively, referring to FIG. 6C, it is assumed that the user is positioned relatively on the left of the electronic device 101, that is, near the first edge display 151. The electronic device 101 may determine that the user is positioned relatively on the left of the electronic device 101, for example, near the first edge display 151. The electronic device 101 may determine the first edge display 151 as a display to be driven in accordance with the acquired user's location.

In operation 530, the electronic device 101 may display the screen on a first display. Accordingly, the electronic device 101 may drive a display, which the user can easily view, and thus not only secure visibility of the user but also prevent power waste by turning off the remaining displays. Meanwhile, as illustrated in FIGS. 6A to 6C, the main display and the edge displays included in the electronic device 101 are only examples, and there is no limitation in the electronic device if the electronic device includes a plurality of displays. Further, the electronic device 101 may determine an area to display the screen on the entire display and display the screen in the determined area.

Figure 7:
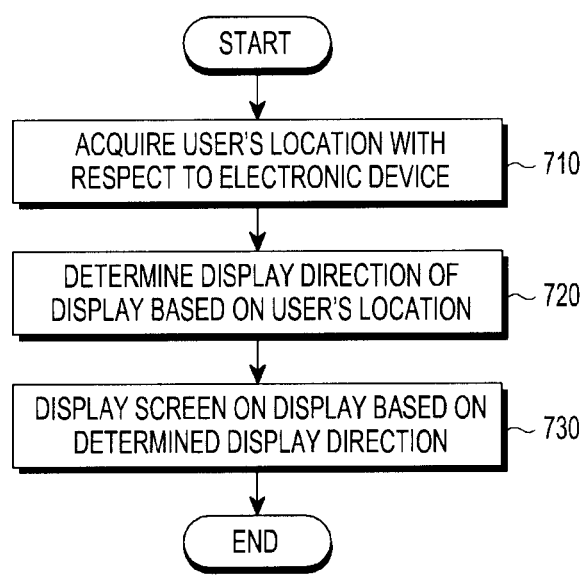
FIG. 7 is a flowchart illustrating a control method of the electronic device according to various embodiments of the present disclosure.
Figure 8A:
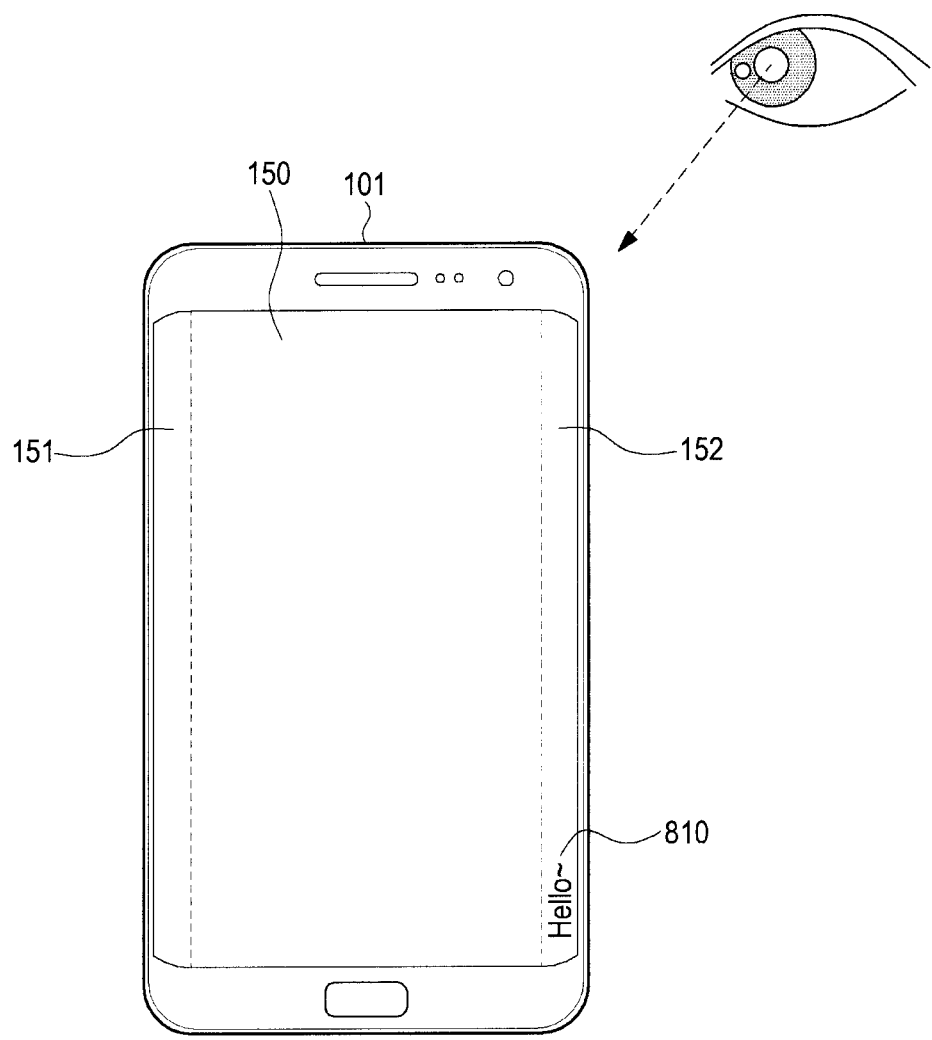
FIG. 8A, FIG. 8B and FIG. 8C are conceptual diagrams of the electronic device according to various embodiments of the present disclosure.
Figure 8B:
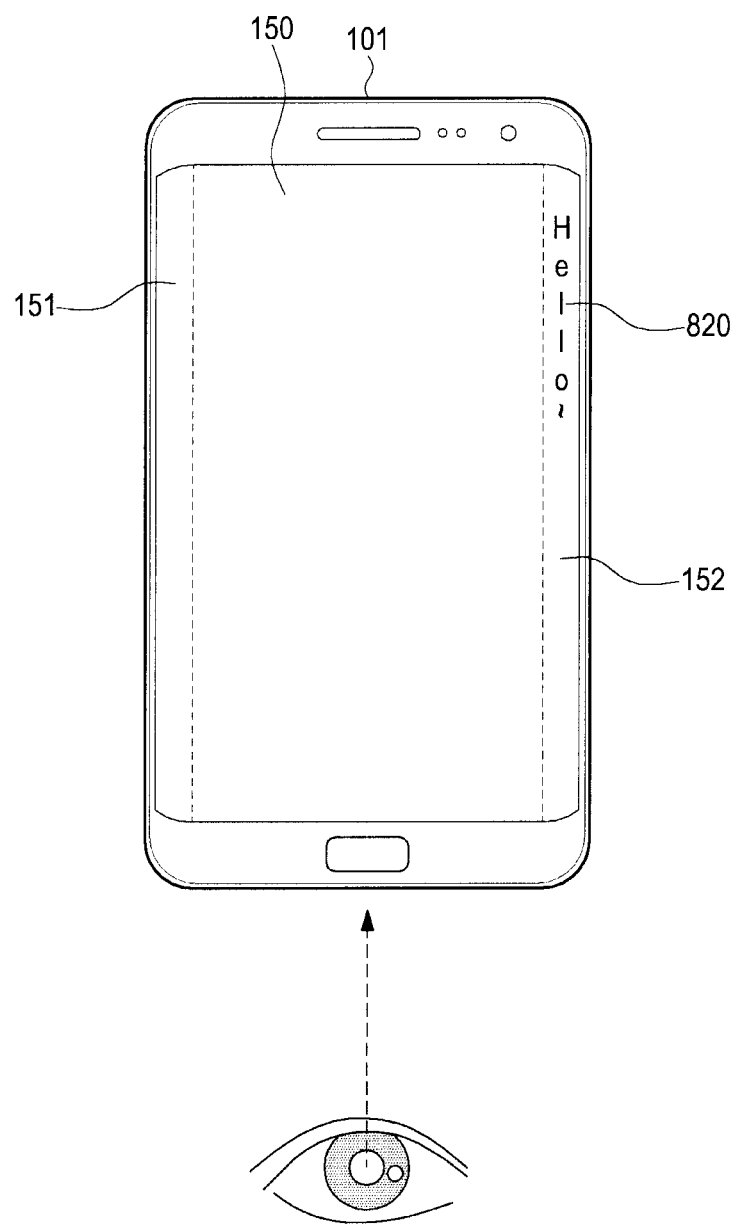
Figure 8C:
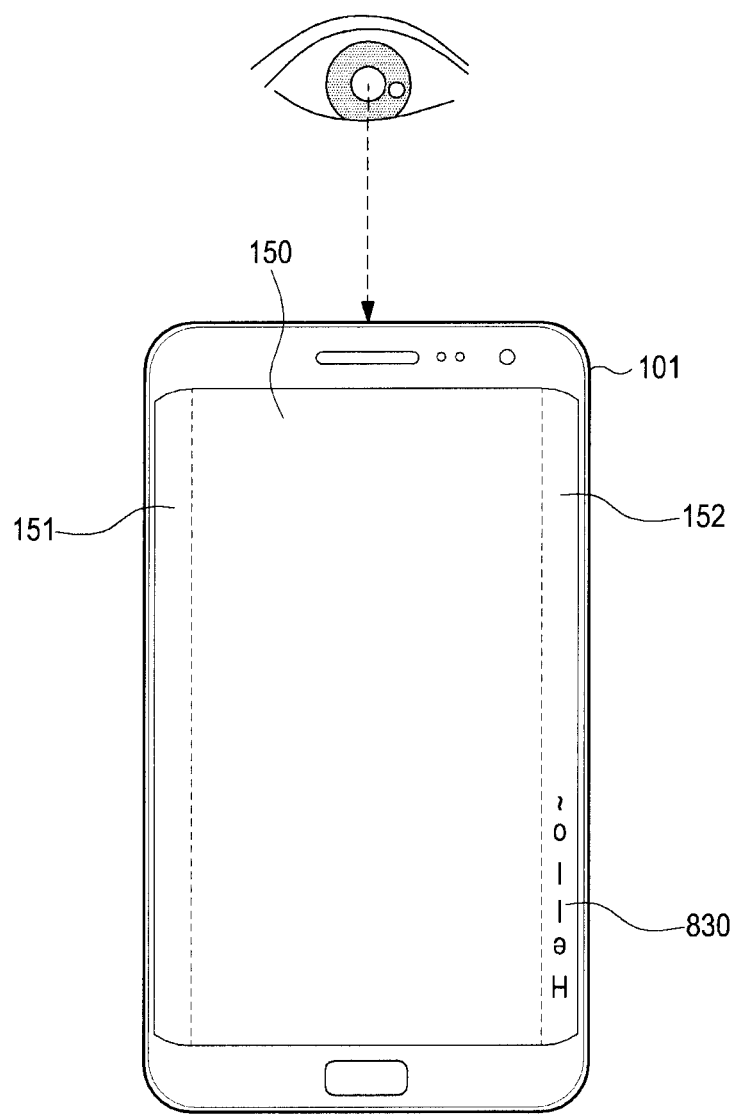
Figure 9A:
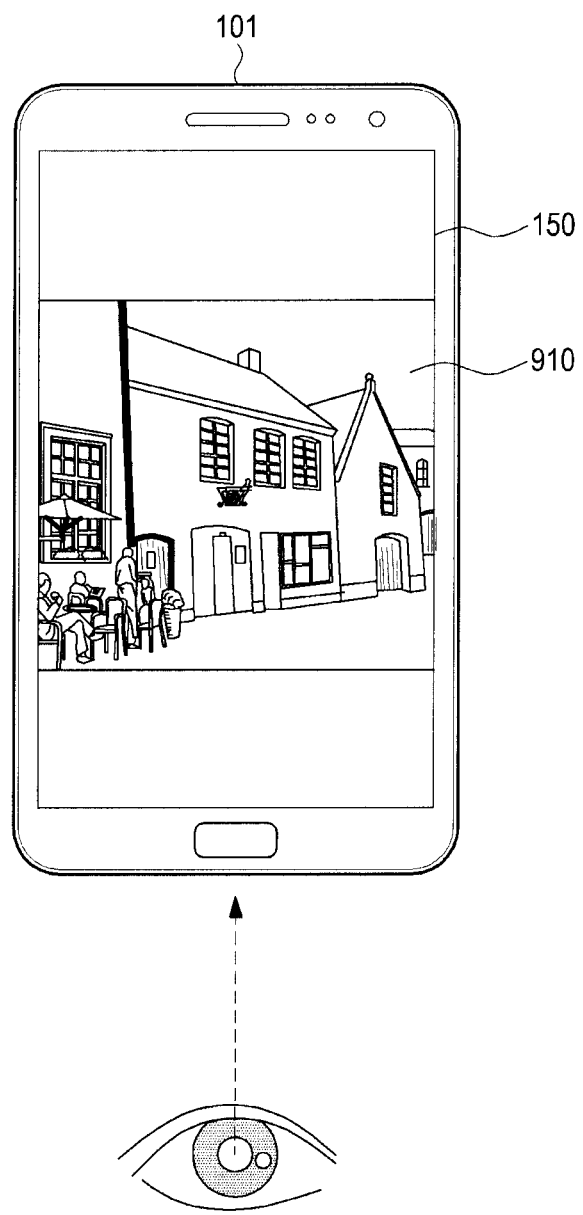
FIG. 9A, FIG. 9B and FIG. 9C are conceptual diagrams of the electronic device according to various embodiments of the present disclosure.
Figure 9B:
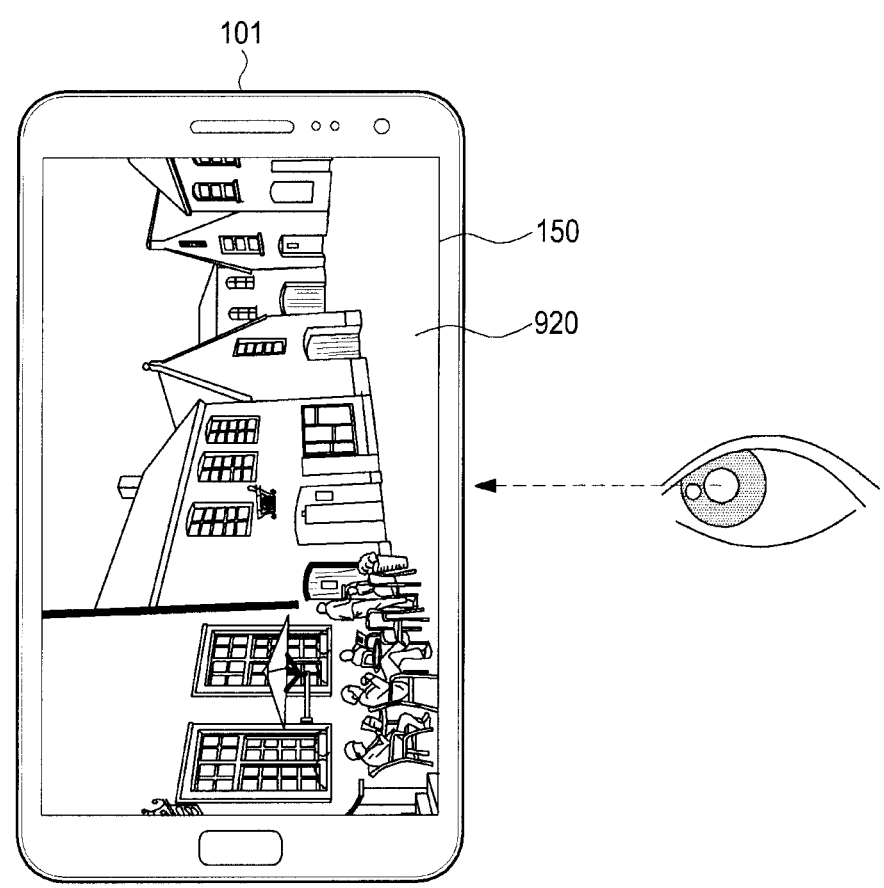
Figure 9C:
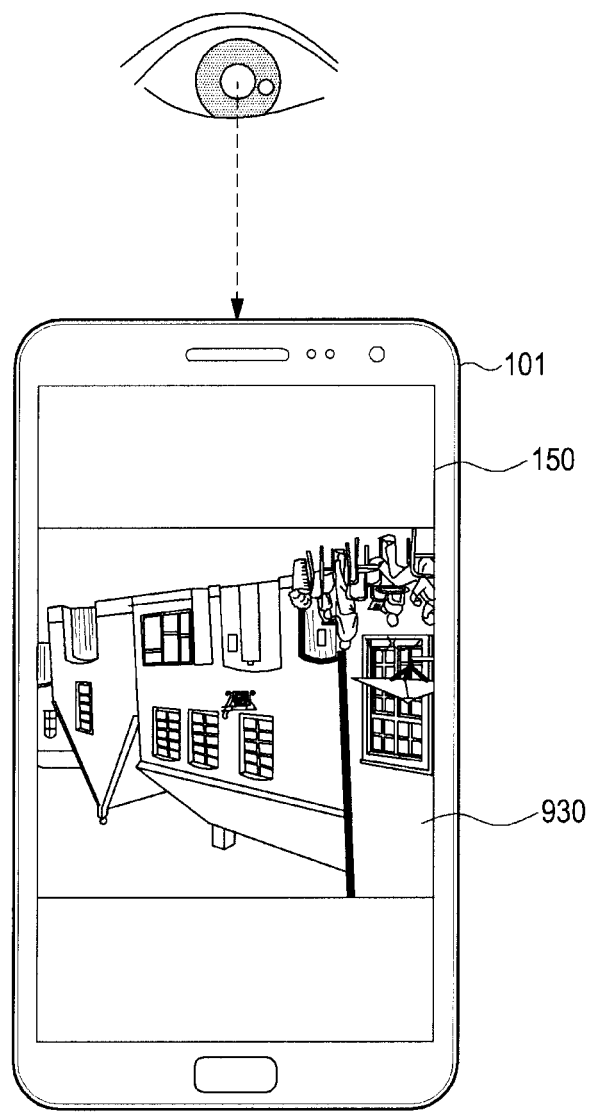

FIG. 7 is a flowchart illustrating a control method of the electronic device according to various embodiments of the present disclosure. The embodiment of FIG. 7 will be described in more detail with reference to FIGS. 8A to 8C and FIGS. 9A to 9C. FIG. 8A to 8C are conceptual diagrams of the electronic device according to various embodiments of the present disclosure. FIG. 9A to 9C are conceptual diagrams of the electronic device according to various embodiments of the present disclosure.

In operation 710, the electronic device 101 may acquire a user's position with respect to the electronic device 101. According to various embodiments of the present disclosure, the electronic device 101 may acquire the user's location based on detection information from various devices such as a microphone, a touch panel, a proximity sensor, a camera, and a transducer, which will be described below in more detail.

In operation 720, the electronic device 101 may determine a display direction of the display based on the user's location. In operation 730, the electronic device 101 may display a screen on the display based on the determined display direction.

For example, referring to FIG. 8A, the electronic device 101 may determine that the user is positioned relative to the right of the electronic device 101. The electronic device 101 may determine the user's location as a location within a coordinate system set based on the center of the electronic device 101 or determine which area among preset partitioned areas includes the user's location. The electronic device 101 may determine a display direction of the screen 810 according to the determined user's location to be 270 to 0 degrees or in the fourth area. In the embodiment of FIG. 8A, the electronic device 101 may determine that the display direction corresponds to a direction from the top to the bottom of the second edge display 152, and determine a display direction of a screen 810 by rotating an object included in the screen 810, that is, characters by 90° from the original display direction. The electronic device 101 may also determine a configuration or arrangement of the object such that the character "e" is positioned on the right of the character "H". According to various embodiments of the present disclosure, the electronic device 101 may determine a display direction including at least one of the configuration, arrangement, and rotation information on the object within the displayed screen. Accordingly, when the user is positioned relatively on the right of the electronic device 101, the user may see the characters "Hello~" in a forward direction. According to various embodiments of the present disclosure, the electronic device 101 may determine an animation direction of the screen 810. For example, the electronic device 101 may display the rotated object "Hello~" such that the object "Hello~" moves from a lower side to an upper side of the second edge display 152. In this case, the electronic device 101 may determine the animation direction to allow the characters to be shown to the user like moving from a left side to a right side.

Referring to FIG. 8B, the electronic device 101 may determine that the user is positioned centered and on the lower side of the electronic device 101. The electronic device 101 may determine a display direction of the screen 820 according to the determined user's location. In the embodiment of FIG. 8B, the electronic device 101 may determine that the display direction corresponds to a direction from the top to the bottom of the second edge display 152, and determine a display direction of a screen 820 by maintaining an object included in the screen 820, that is, characters in the original display direction. The electronic device 101 may also determine a configuration or arrangement of the object such that the character "e" is positioned below the character "H". According to various embodiments of the present disclosure, the electronic device 101 may determine a display direction including at least one of the configuration, arrangement, and rotation information on the object within the displayed screen. Accordingly, when the user is positioned relatively on the lower side of the electronic device 101, the user may see the characters "Hello~" in a forward direction. According to various embodiments of the present disclosure, as opposed to arranging the character "e" next to the character "H" while rotating the characters in FIG. 8A, the electronic device 101 may arrange the character "e" below the character "H" without rotation of the characters in FIG. 8B. That is, the electronic device 101 may determine at least one of the configuration, arrangement, and rotation information on the object based on the user's location. According to various embodiments of the present disclosure, the electronic device 101 may determine an animation direction of the screen 820. For example, the electronic device 101 may display the object "Hello~" such that the object "Hello~" moves from an upper side to a lower side of the second edge display 152. In this case, the electronic device 101 may determine the animation direction to allow the characters to be shown to the user like moving from the upper side to the lower side.

Referring to FIG. 8C, the electronic device 101 may determine that the user is positioned relatively on the upper side of the electronic device 101. The electronic device 101 may determine a display direction of the screen 830 according to the determined user's location. In the embodiment of FIG. 8C, the electronic device 101 may determine that the display direction corresponds to a direction from the bottom to the top of the second edge display 152, and determine a display direction of a screen 830 by rotating an object included in the screen 830, that is, characters by 180. In one embodiment, that the user is located at a 180 to 270 degrees angle corresponding to the third area. The electronic device 101 may also determine a configuration or arrangement of the object such that the character "e" is positioned below the character "H". According to various embodiments of the present disclosure, the electronic device 101 may determine a display direction including at least one of the configuration, arrangement, and rotation information on the object within the displayed screen. Accordingly, when the user is positioned relatively on the upper side of the electronic device 101, the user may see the characters "Hello~" in a forward direction. According to various embodiments of the present disclosure, as opposed to arranging the character "e" next to the character "H" while rotating the characters in FIG. 8A, the electronic device 101 may arrange the character "e" below the character "H" while rotating the characters in FIG. 8C. That is, the electronic device 101 may determine at least one of the configuration, arrangement, and rotation information on the object based on the user's location. According to various embodiments of the present disclosure, the electronic device 101 may determine an animation direction of the screen 830. For example, the electronic device 101 may display the object "Hello~" such that the object "Hello~" moves from a low side to an upper side of the second edge display 152. In this case, the electronic device 101 may determine the animation direction to allow the characters to be shown to the user like moving from the upper side to the lower side.

The electronic device 101 may determine and display the above described screen display direction according to the user's location. Alternatively, the electronic device 101 may change and display the original screen based on the correlation information between the preset user's location and the screen change.

FIG. 9A to 9C are conceptual diagrams of the electronic device according to various embodiments of the present disclosure. Embodiments of FIGS. 9A to 9C may include one display 150 in contrast with the embodiments of FIGS. 8A to 8C. That is, the electronic device 101 according to various embodiments of the present disclosure may determine the display direction of the screen displayed on the one display 150 based on the user's location.

Referring to FIG. 9A, the electronic device 101 may display a screen 910 by application execution. The electronic device 101 may determine that the user is positioned relatively on the lower side of the electronic device 101. The electronic device 101 may determine the user's location as a location within a coordinate system set based on the center of the electronic device 101 or determine which area among preset partitioned areas includes the user's location. The electronic device 101 may determine a display direction of the screen 910 according to the determined user's location.

In the embodiment of FIG. 9A, the electronic device 101 may determine that a display direction corresponds to a direction of the original screen. That is, the electronic device 101 may display the original screen in the original display direction without rotating the original screen. Accordingly, when the user is positioned relatively on the lower side of the electronic device 101, the user may see a screen 910 in a forward direction of the original screen.

Referring to FIG. 9B, the electronic device 101 may display a screen 920 by application execution. The electronic device 101 may determine that the user is positioned relatively on the right of the electronic device 101. The electronic device 101 may determine the user's location as a location within a coordinate system set based on the center of the electronic device 101 or determine which area among preset partitioned areas includes the user's location. For example, the angle of the user's location may be measured to be 270 to 0 degrees or in the fourth area. The electronic device 101 may determine a display direction of the screen 920 according to the determined user's location.

In the embodiment of FIG. 9B, the electronic device 101 may determine the display direction by rotating the original screen direction by 90°. Accordingly, when the user is positioned relatively on the right of the electronic device 101, the user may see the screen 920 in a forward direction of the original screen.

Referring to FIG. 9C, the electronic device 101 may display a screen 930 by application execution. The electronic device 101 may determine that the user is positioned relatively on the upper side of the electronic device 101. The electronic device 101 may determine the user's location as a location within a coordinate system set based on the center of the electronic device 101 or determine which area among preset partitioned areas includes the user's location. The electronic device 101 may determine a display direction of the screen 930 according to the determined user's location.

In the embodiment of FIG. 9C, the electronic device 101 may determine the display direction by rotating the original screen direction by 180°. For example, the angle of the user's location may be measured to be 180 to 270 degrees or in the third area. Accordingly, when the user is positioned relatively on the right of the electronic device 101, the user may see the screen 930 in a forward direction of the original screen.

The electronic device 101 according to the embodiments of FIGS. 9A to 9C may display the screen by simply rotating only the screen display direction according to the user's location without controlling the arrangement of the object within the screen. The electronic device 101 may determine a rotation angle according to the user's location and display the screen at the determined rotation angle. Alternatively, the electronic device 101 may configure and display the screen based on, for example, the correlation information between the user's location and the screen change as shown in Table 2.

Figure 10:
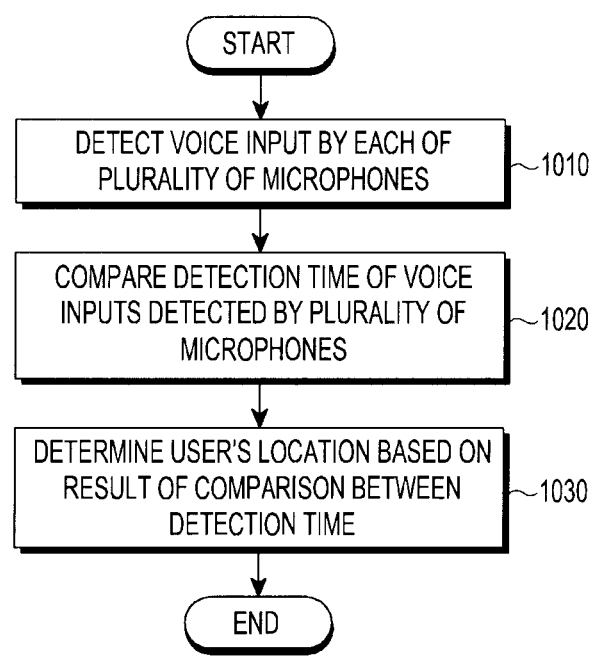
FIG. 10 is a flowchart illustrating a method of acquiring a user's location according to various embodiments of the present disclosure.
Figure 11:
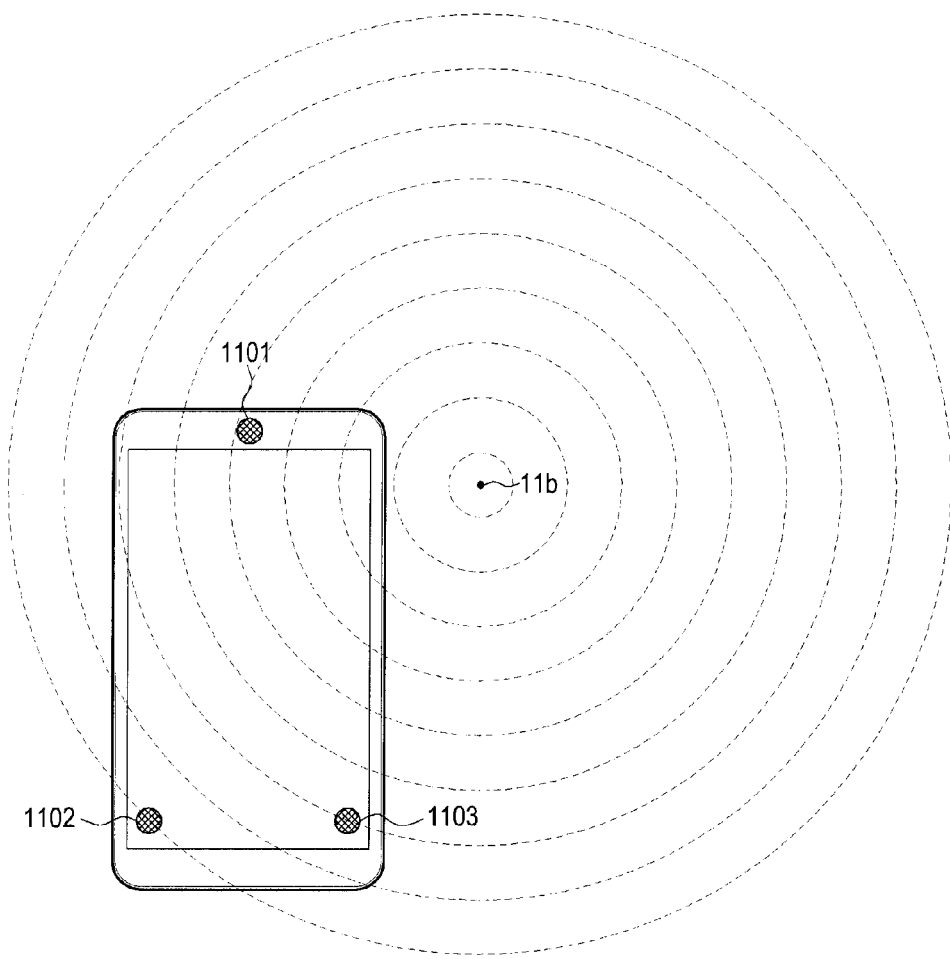
FIG. 11 is a conceptual diagram illustrating a method of acquiring a user's location according to various embodiments of the present disclosure.

FIG. 10 is a flowchart illustrating a method of acquiring a user's location according to various embodiments of the present disclosure. The embodiment of FIG. 10 will be described in more detail with reference to FIG. 11. FIG. 11 is a conceptual diagram illustrating a method of acquiring a user's location according to various embodiments of the present disclosure.

In operation 1010, the electronic device 101 may detect a voice input from each of a plurality of microphones. For example, the electronic device 101 may include a plurality of microphones 1101, 1102, and 1103 as illustrated in FIG. 11. The plurality of microphones 1101, 1102, and 1103 may be disposed on different positions of the electronic devices 101, and there is no limitation in the number or arrangement positions of microphones 1101, 1102, and 1103.

In operation 1020, the electronic device 101 may compare detection time between voice inputs detected by the plurality of microphones 1101, 1102, and 1103. For example, a voice from a voice source 11b may progress in a spherical wave. Accordingly, a time when the microphone detects the voice may be different according to a distance from the source 11b. For example, as illustrated in FIG. 11, when the source 11b is positioned near a first microphone 1101, the first microphone 1101 may first detect a voice, a third microphone 1103 may detect the voice, and then a second microphone 1102 may detect the voice. The electronic device 101 may compare the time at which the plurality of microphones 1101, 1102, and 1103 detect the voice. For example, the time difference between the first microphone to receive the sound, e.g., microphone 1101, and another microphone, e.g., microphone 1103 may be $\Delta t_1$. The product of the speed of sound and the time difference $c\Delta A_1$ is how much further the source of the sound is from the microphone 1103 than microphone 1101. The product of the speed of sound and the time difference $c\Delta t_2$ is how much further the source of the sound is from the microphone 1102 than microphone 1101. With the following distances, at least an angle of the user's location can be determined.

In operation 1030, the electronic device 101 may determine a user's location based on a result of the comparison between the detection time. According to the present embodiment, the electronic device 101 may determine that the location of the voice source 11b corresponds to the user's location. In addition, the electronic device 101 may determine the user's location by verifying whether a result of analysis of the voice is from the human. The electronic device 101 may determine the user's location by inversely calculating the location of the source 11b from the detection time of each of the microphones 1101, 1102, and 1103. Alternatively, the electronic device 101 may determine a partitioned area to which the user's location belongs among preset partitioned areas.

According to the above description, the electronic device 101 may determine the user's location based on the detected voice.

Figure 12:
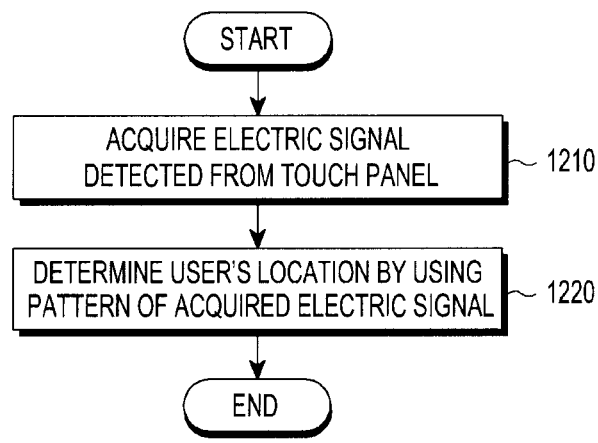
FIG. 12 is a flowchart illustrating a method of acquiring a user's location according to various embodiments of the present disclosure.
Figure 13A:
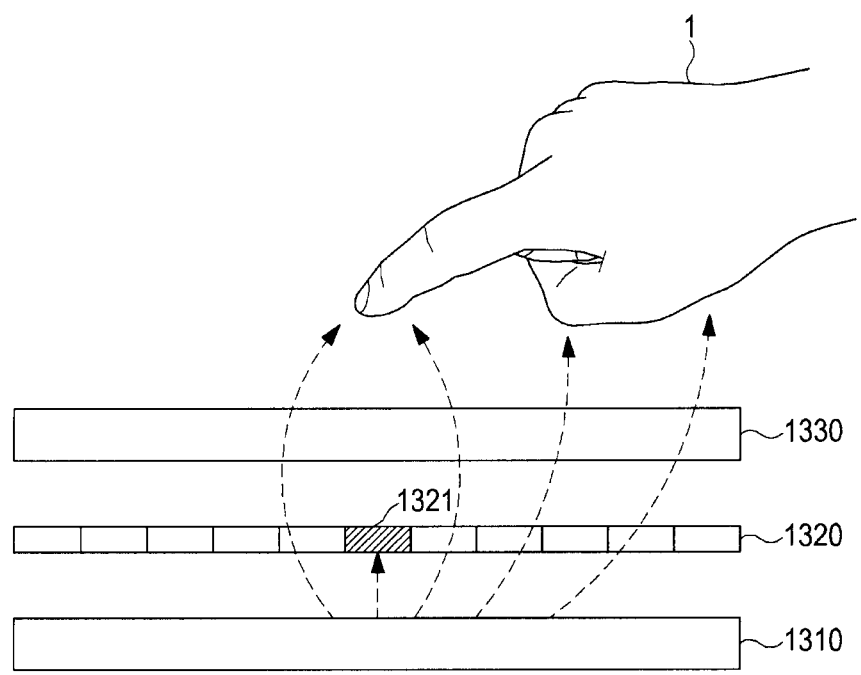
FIG. 13A, FIG. 13B and FIG. 13C are conceptual diagrams illustrating a method of acquiring a user's location according to various embodiments of the present disclosure.
Figure 13B:
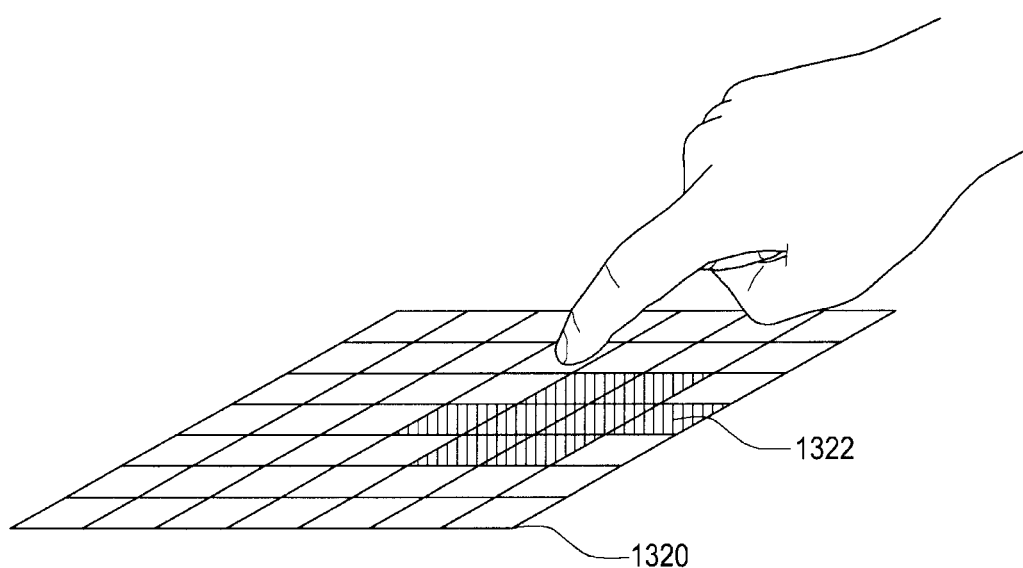
Figure 13C:
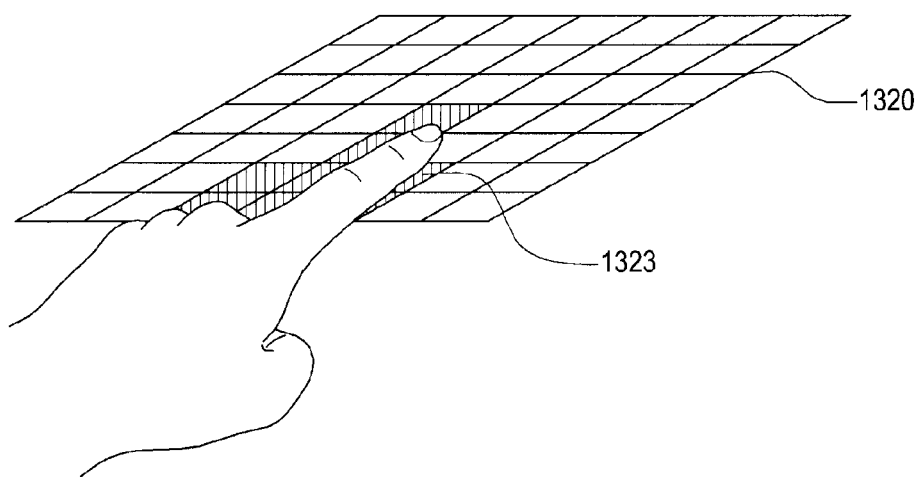

FIG. 12 is a flowchart illustrating a method of acquiring a user's location according to various embodiments of the present disclosure. The embodiment of FIG. 12 will be described in more detail with reference to FIGS. 13A to 13C. FIGS. 13A to 13C are conceptual diagrams illustrating a method of acquiring a user's location according to various embodiments of the present disclosure.

In operation 1210, the electronic device 101 may acquire electric signals from the touch panel. For example, as illustrated in FIG. 13A, the electronic device 101 may include a touch panel, and the touch panel may include a transmission electrode 1310, a reception electrode 1320, and a window 1330. The transmission electrode 1310 may transmit a transmission signal for a preset transmission period. For example, the transmission electrode 1310 may be implemented by a transparent electrode such as ITO, and the electronic device 101 may apply a driving current to the transmission electrode 1310 for a preset transmission period. The transmission electrode 1310 may generate a transmission signal, for example, an electric field based on the applied driving current.

The reception electrode 1320 may include a plurality of sub electrodes, and each of the sub electrodes may generate an electric signal for a scanning period thereof based on a surrounding electric field. For example, each of the plurality of sub electrodes may be implemented by a transparent electrode such as ITO, and may generate an electric signal according to the surrounding electric field, for example, the transmission signal. A first sub electrode 1321 corresponding to the scanning period may generate an electric signal based on the surrounding electric field. The electronic device 101 may determine touch or proximity information on the electronic device 101 based on the electric signal from each of the plurality of sub electrodes of the reception electrode 1320. For example, as illustrated in FIG. 13A, when a user's hand 1 is in proximity to the touch panel, some of the transmission signals may be applied to the user's hand 1. A strength of the electric signal generated from the electrode, to which the user's hand 1 is in proximity, may be weaker than a strength of the electric signal generated from the electrode around which there is no user's hand 1. Accordingly, the electronic device 101 may determine a touch panel area to which the user's hand 1 is in proximity.

In operation 1220, the electronic device 101 may determine the user's location by using a pattern of the acquired electric signal.

For example, as illustrated in FIG. 13B, the electronic device 101 may determine a touch panel area 1322 determined to be in proximity to the user's hand 1. The electronic device 101 may determine that an area having an electric signal from the touch panel, which is smaller than a threshold, corresponds to the touch panel area 1322 determined to be in proximity to the user's hand 1. As illustrated in FIG. 13B, when the user's hand 1 is positioned relatively on the right of the electronic device 101, the touch panel 1322 having a pattern in which a horizontal length is relatively longer than a vertical length may be detected. Further, the touch panel area 1322 may be detected relatively in the right neighborhood of the touch panel 1320. The electronic device 101 may determine the user's location based on at least one of the pattern and the location of the area having a strength smaller than a preset threshold. The electronic device 101 may store in advance correlation information between at least one of the pattern and the location of the area having the strength smaller than the preset threshold and the user's location, and determine the user's location based on the correlation information.

In another example, as illustrated in FIG. 13C, the electronic device 101 may determine a touch panel area 1323 determined to be in proximity to the user's hand 1. The electronic device 101 may determine that an area having an electric signal from the touch panel, which is smaller than a threshold, corresponds to the touch panel area 1323 determined to be in proximity to the user's hand 1. As illustrated in FIG. 13C, when the user's hand is positioned relatively on the lower side of the electronic device 101, the touch panel area 1323 having a pattern in which a vertical length is relatively longer than a horizontal length may be detected. Further, the touch panel area 1323 may be detected relatively in the lower neighborhood of the touch panel 1320. The electronic device 101 may determine the user's location based on at least one of the pattern and the location of the area having a strength smaller than a preset threshold. The electronic device 101 may store in advance correlation information between at least one of the pattern and the location of the area having the strength smaller than the preset threshold and the user's location, and determine the user's location based on the correlation information.

As described above, the electronic device 101 may determine the user's location based on the electric signal from the touch panel.

Figure 14:
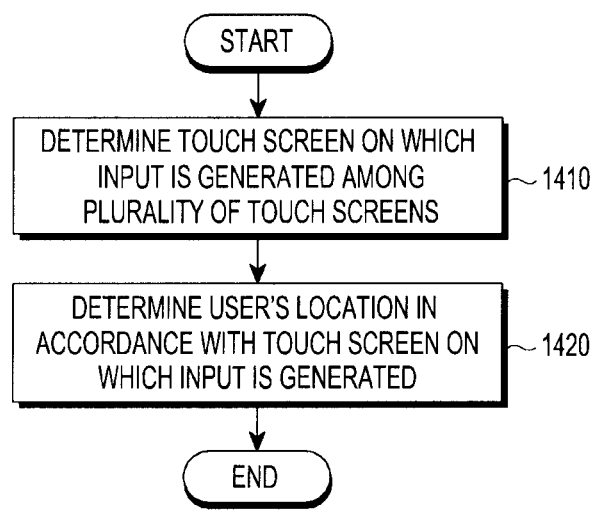
FIG. 14 is a flowchart illustrating a method of acquiring a user's location according to various embodiments of the present disclosure.
Figure 15A:
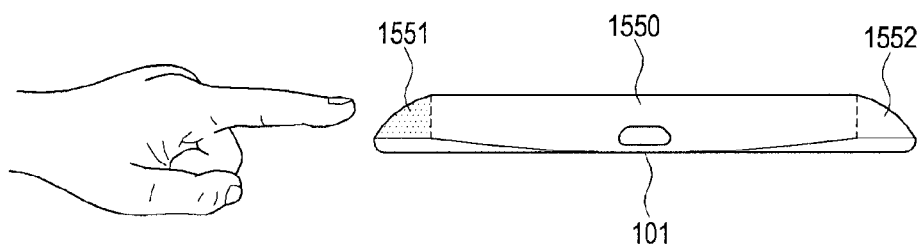
FIG. 15A and FIG. 15B are conceptual diagrams illustrating a method of acquiring a user's location according to various embodiments of the present disclosure.
Figure 15B:
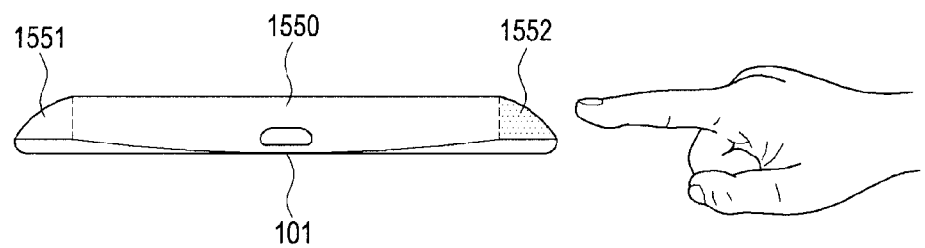

FIG. 14 is a flowchart illustrating a method of acquiring a user's location according to various embodiments of the present disclosure. The embodiment of FIG. 14 will be described in more detail with reference to FIGS. 15A and 15B. FIGS. 15A and 15B are conceptual diagrams illustrating a method of acquiring a user's location according to various embodiments of the present disclosure.

In operation 1410, the electronic device 101 may determine a touch screen, on which an input is generated, among a plurality of touch screens. In operation 1420, the electronic device 101 may determine a user's location in accordance with the touch screen on which the input is generated.

For example, as illustrated in FIG. 15A, the electronic device 101 may include a plurality of touch screens 1550, 1551, and 1552. The user may touch a second touch screen 1551 or make the user's hand be in proximity to a second touch screen 1551. The electronic device 101 may determine that the touch screen, on which the input such as a touch or proximity is generated, corresponds to the second touch screen 1551. The electronic device 101 may determine that the user's location corresponds to a relatively left area of the electronic device 101 based on the second touch screen 1551. Alternatively, as illustrated in FIG. 15B, the user may touch a third touch screen 1552 or make the user's hand be in proximity to the third touch screen 1552. The electronic device 101 may determine that the touch screen, on which the input such as a touch or proximity is generated, corresponds to the third touch screen 1552. The electronic device 101 may determine that the user's location corresponds to a relatively right area of the electronic device 101 based on the third touch screen 1552.

As described above, the electronic device 101 according to various embodiments of the present disclosure may determine the user's location based on the touch screen on which the input is detected. Meanwhile, as described above, when a plurality of touch screens are implemented by one hardware, the electronic device 101 may determine the user's location based on the area in which the input is detected on the entire touch screen.

Figure 16:
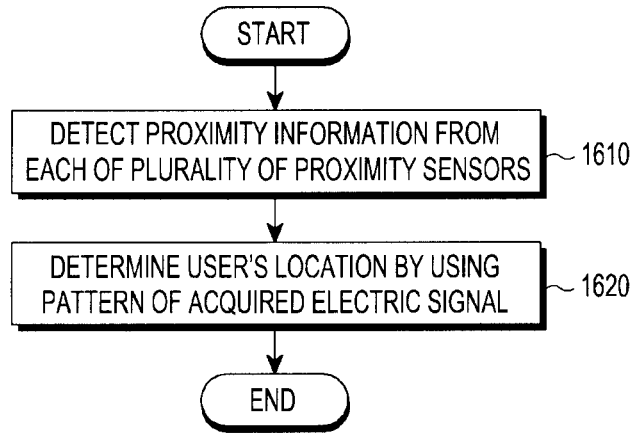
FIG. 16 is a flowchart illustrating a method of acquiring a user's location according to various embodiments of the present disclosure.
Figure 17A:
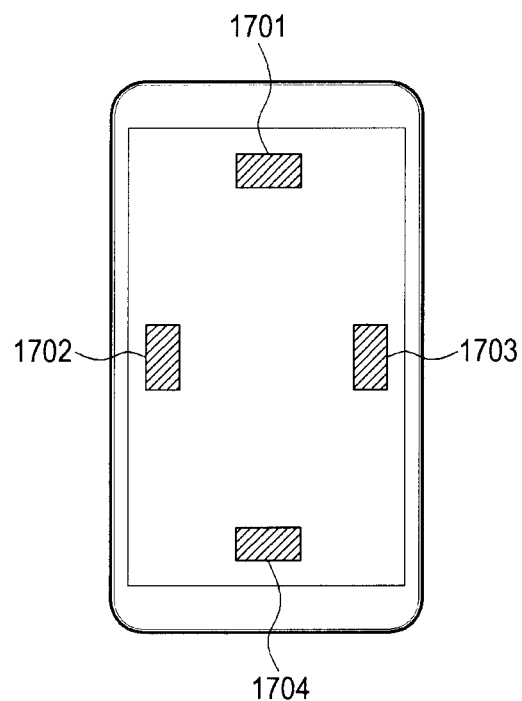
FIG. 17A, FIG. 17B and FIG. 17C are conceptual diagrams illustrating a method of acquiring a user's location according to various embodiments of the present disclosure.
Figure 17B:
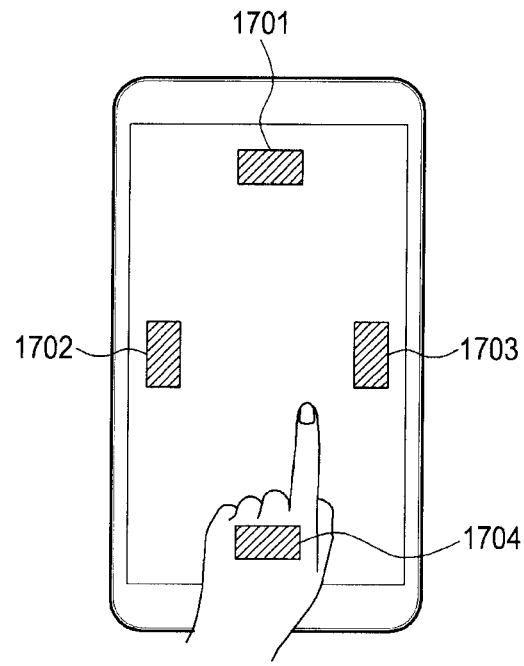
Figure 17C:
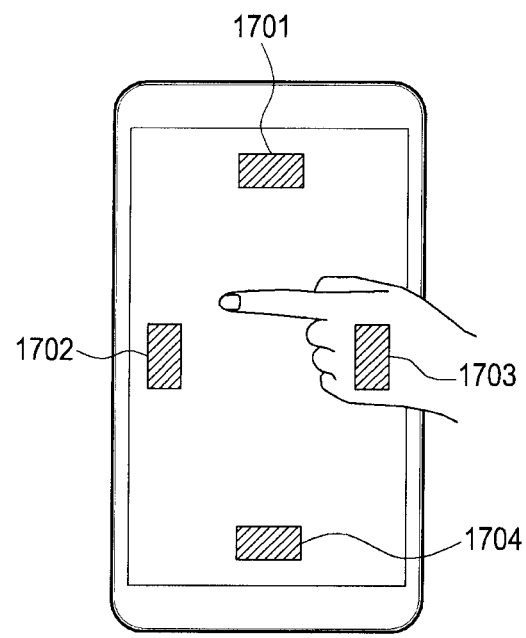

FIG. 16 is a flowchart illustrating a method of acquiring a user's location according to various embodiments of the present disclosure. The embodiment of FIG. 16 will be described in more detail with reference to FIGS. 17A to 17C. FIGS. 17A to 17C are conceptual diagrams illustrating a method of acquiring a user's location according to various embodiments of the present disclosure.

In operation 1610, the electronic device 101 may detect proximity information from each of a plurality of proximity sensors, such as the proximity sensors 240G. For example, the electronic device 101 may include a plurality of proximity sensors 1701, 1702, 1703, and 1704 as illustrated in FIGS. 17A to 17C. The plurality of proximity sensors 1701, 1702, 1703, and 1704 may be disposed on different positions of the electronic devices 101, and there is no limitation in the number or arrangement positions of proximity sensors 1701, 1702, 1703, and 1704. The proximity sensors 1701, 1702, 1703, and 1704 may detect proximity information when an object is in proximity to the proximity sensors.

In operation 1620, the electronic device 101 may determine the user's location based on the proximity information detected from each of the plurality of proximity sensors. For example, as illustrated in FIG. 17B, the electronic device 101 may detect the proximity information indicating that the user's hand is in proximity to the fourth proximity sensor 1704. The electronic device 101 may determine that the user's location corresponds to the relatively lower side of the electronic device 101 based on the proximity information from the fourth proximity sensor 1704. In another example, as illustrated in FIG. 17C, the electronic device 101 may detect the proximity information indicating that the user's hand is in proximity to the third proximity sensor 1703. The electronic device 101 may determine that the user's location corresponds to the relatively right side of the electronic device 101 based on the proximity information from the third proximity sensor 1703.

Figure 18:
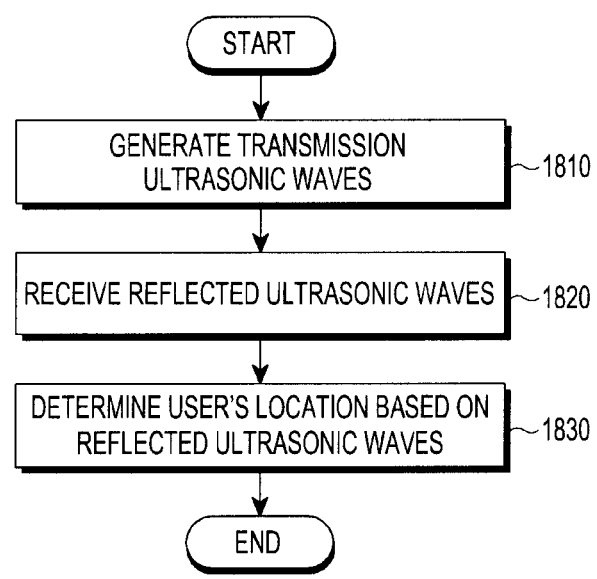
FIG. 18 is a flowchart illustrating a method of acquiring a user's location according to various embodiments of the present disclosure.
Figure 19:
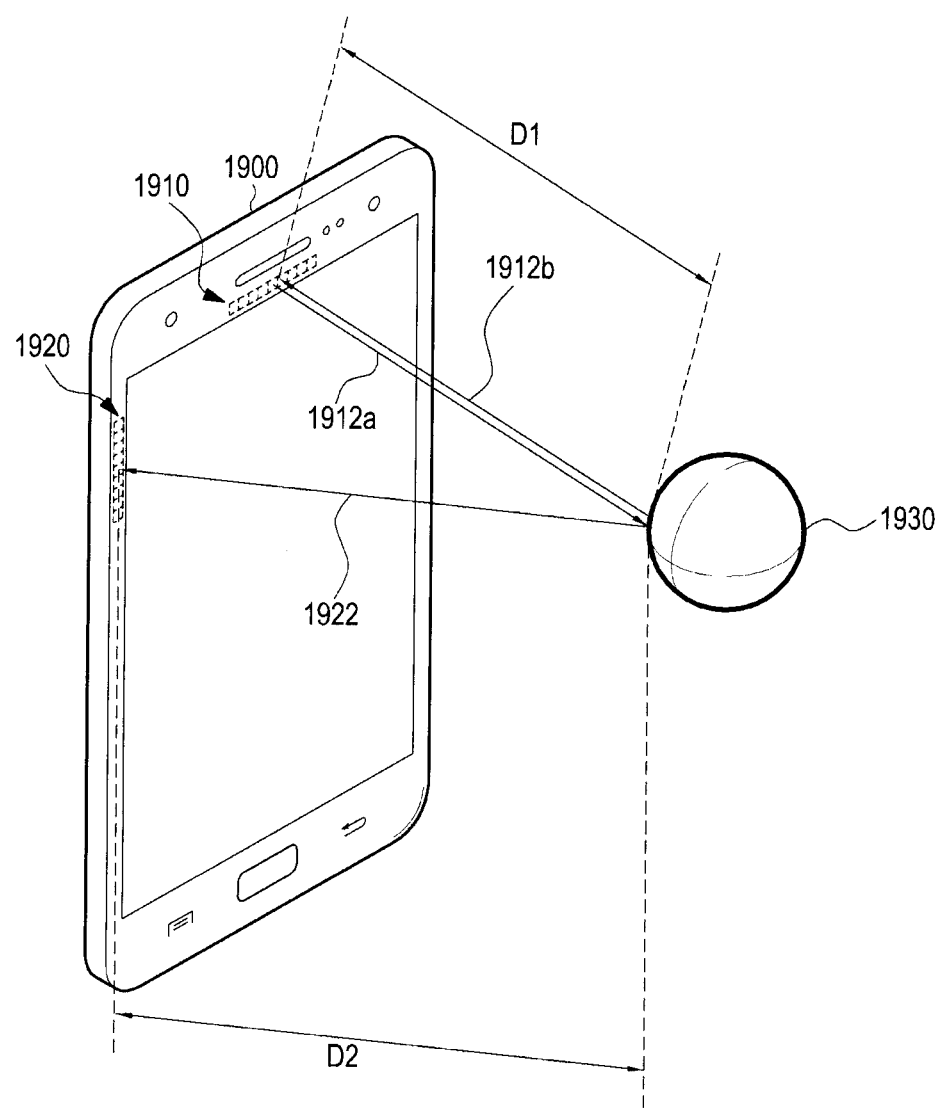
FIG. 19 and FIG. 20 are conceptual diagrams illustrating a method of acquiring a user's location according to various embodiments of the present disclosure.
Figure 20:
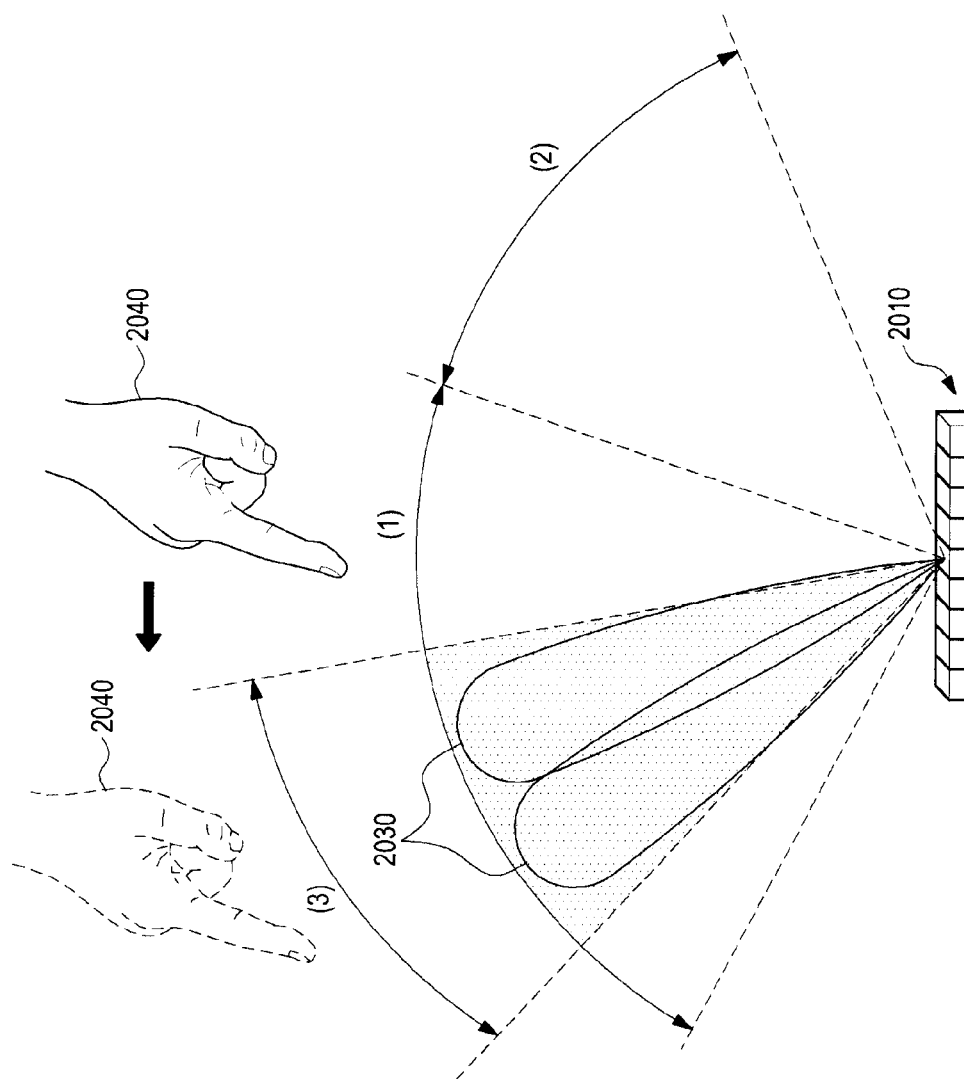

FIG. 18 is a flowchart illustrating a method of acquiring a user's location according to various embodiments of the present disclosure. The embodiment of FIG. 18 will be described in more detail with reference to FIGS. 19 and 20. FIGS. 19 and 20 are conceptual diagrams illustrating a method of acquiring a user's location according to various embodiments of the present disclosure.

In operation 1810, the electronic device 101 may generate transmission ultrasonic waves by using at least one transducer. In operation 1820, the electronic device 101 may receive reflected ultrasonic waves. In operation 1830, the electronic device 101 may determine the user's location based on the received reflected ultrasonic waves. For example, referring to FIG. 19, the electronic device 101 may include one or more transducers 1910 and 1920. According to various embodiments of the present disclosure, the first transducer 1910 may output a transmission beam 1912a and the second transducer 1920 may detect a returning reception beam 1922, which is a reflection of the output transmission beam 1912a from a target object. The electronic device 101 may calculate a distance to the target object through Time of Flight (ToF) until the transmission beam is received after being output. The electronic device 101 may calculate distances D1 and D2 to a target object 1930 based on the reflected ultrasonic waves of the transmission transducer 1910 and the reception transducer array 1920 separated from each other.

As illustrated in FIG. 19, the transmission beam 1912a output by the first transducer 1910 may reach the target object 1930 and may be reflected toward the second transducer 1920. The second transducer array 1920 may detect the reflected transmission beam.

After the output of the transmission beam (transmission mode), the first transducer 1910 may switch to a reception mode and also detect a beam 1912b reflected from the target object 1930. According to the above description, the electronic device 101 may identify the distances D1 and D2 to the target object 1930 and determine the user's location based on the identified distances.

Further, as illustrated in FIG. 20, the electronic device 101 may detect a change in a location of a user's hand 2040 by measuring reflected ultrasonic waves while a beamforming direction 2030 of a transducer 2010 is changed. According to the above description, the electronic device 101 may determine the user's location based on ultrasonic wave information.

According to certain embodiments, the electronic device 101 can project a screen based on the user's location with respect to the electronic device 101.

Figure 21:
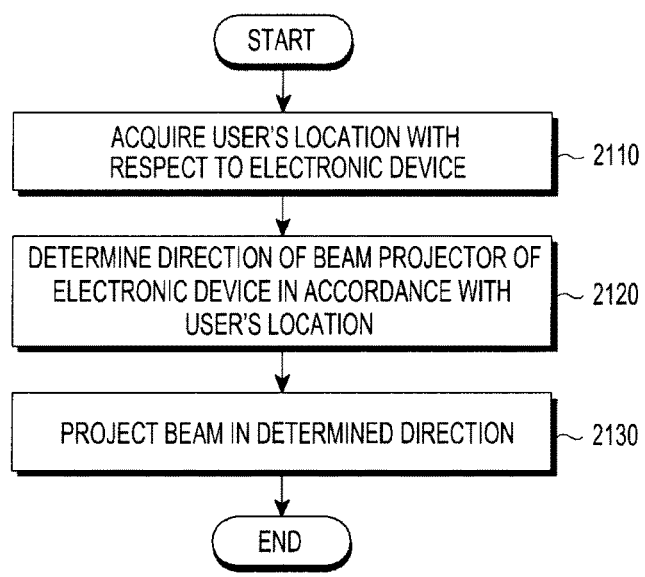
FIG. 21 is a flowchart illustrating a control method of the electronic device according to various embodiments of the present disclosure.
Figure 22:
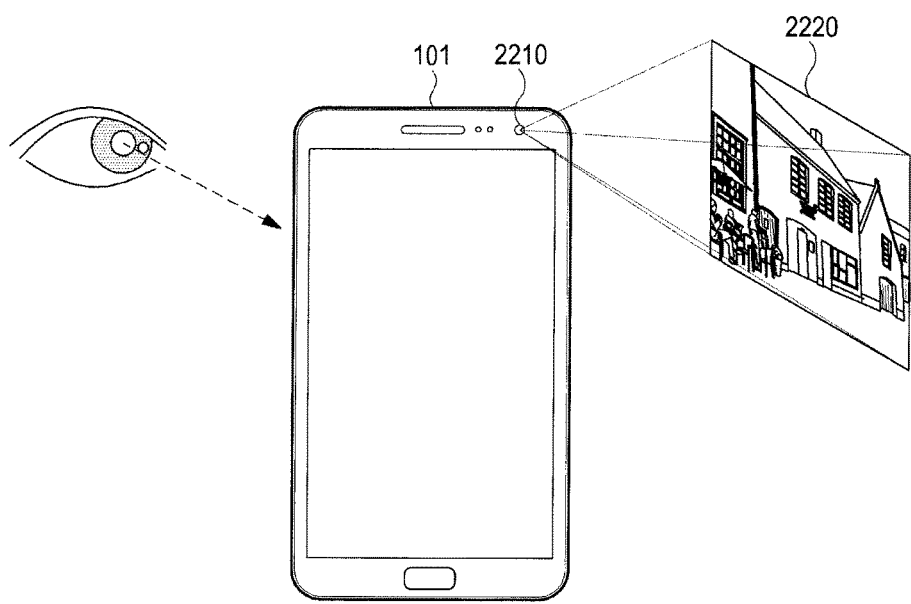
FIG. 22 is a conceptual diagram illustrating a beam projector according to various embodiments of the present disclosure.

FIG. 21 is a flowchart illustrating a control method of the electronic device according to various embodiments of the present disclosure. The embodiment of FIG. 21 will be described in more detail with reference to FIG. 22. FIG. 22 is a conceptual diagram illustrating a beam projector according to various embodiments of the present disclosure.

In operation 2110, the electronic device 101 may acquire a user's position with respect to the electronic device 101. As described above, the electronic device 101 according to various embodiments of the present disclosure may acquire the user's location based on detection information from various devices such as the microphone, the touch panel, the proximity sensor, the camera, and the transducer.

In operation 2120, the electronic device 101 may determine a direction of a beam projector of the electronic device according to the user's location. For example, as illustrated in FIG. 22, the electronic device 101 may include a beam projector 2210 which may beam-project a screen 2220. The electronic device 101 may determine a beam projector direction of the beam projector 2210. The electronic device according to various embodiments of the present disclosure may determine the beam projector direction according to the user's location. In operation 2130, the electronic device 101 may project the beam in the determined direction. For example, as illustrated in FIG. 22, when it is determined that the user is positioned relatively on the left of the electronic device 101, the electronic device 101 may project the beam onto a relatively right screen 2220 of the electronic device 101. The electronic device 101 may store in advance correlation information between the user's location and the beam projector direction and may determine the beam projector direction based on the correlation information.

Figure 23:
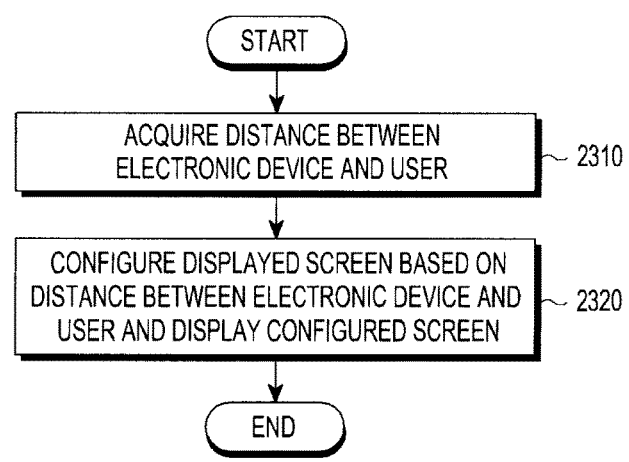
FIG. 23 is a flowchart illustrating a control method of the electronic device according to various embodiments of the present disclosure.
Figure 24A:
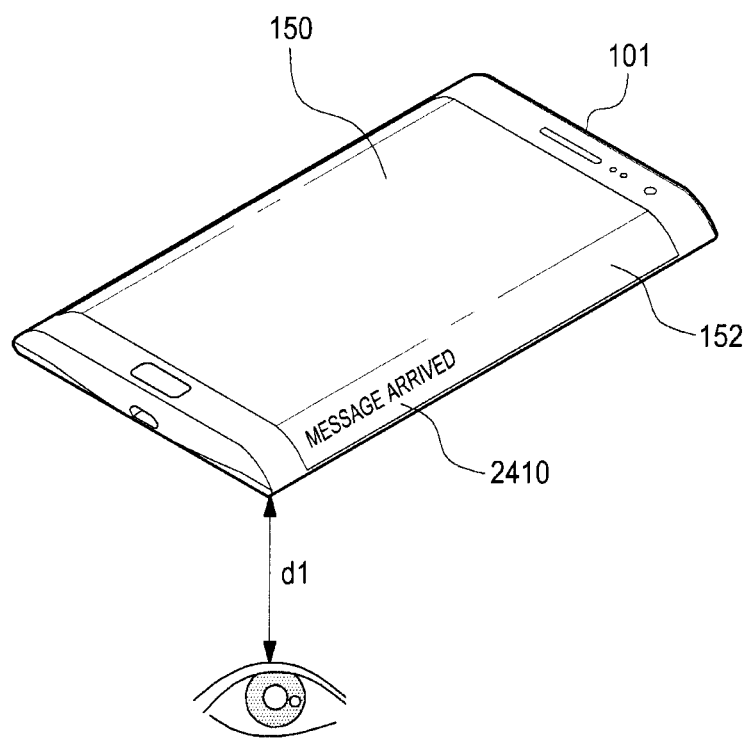
FIG. 24A and FIG. 24B are conceptual diagrams illustrating an output of the electronic device based on a distance according to various embodiments of the present disclosure.
Figure 24B:
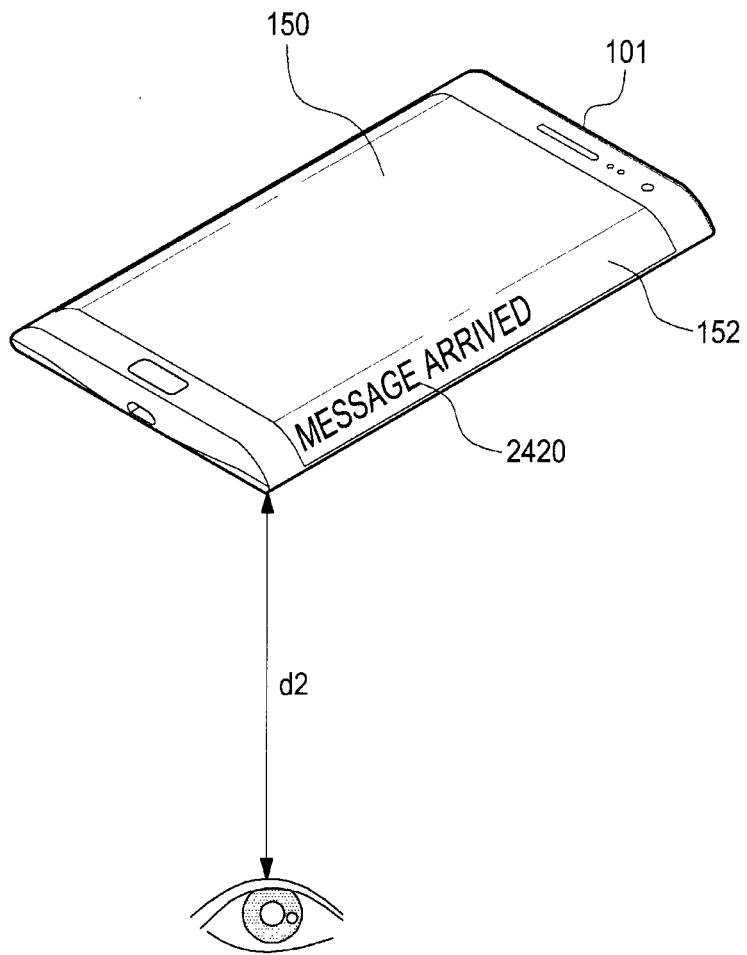

FIG. 23 is a flowchart illustrating a control method of the electronic device according to various embodiments of the present disclosure. The embodiment of FIG. 23 will be described in more detail with reference to FIGS. 24A and 24B. FIGS. 24A and 24B are conceptual diagrams illustrating an output of the electronic device based on a distance according to various embodiments of the present disclosure.

In operation 2310, the electronic device 101 may acquire a distance between the electronic device 101 and the user. For example, the electronic device 101 may include hardware such as a Time Of Flight (TOF) camera or a depth camera, which may photograph a three dimensional image. When the electronic device 101 includes the TOF camera or the depth camera, the electronic device 101 may transmit a light and receive a reflected light. The electronic device 101 may determine the distance between the electronic device 101 and the user based on information from the TOF camera or the depth camera. According to another embodiment, the electronic device 101 may determine the distance through transmission/reception of an RF signal, an ultrasonic signal, or an infrared signal.

In operation 2320, the electronic device 101 may configure a displayed screen based on the distance between the electronic device 101 and the user and display the configured screen. For example, referring to FIG. 24A, the electronic device 101 may acquire a first distance d1 as the distance between the electronic device 101 and the user. The electronic device 101 may control and display an object, that is, a size of characters within a screen 2410 according to the first distance d1. Referring to FIG. 24B, the electronic device 101 may acquire a second distance d2 as the distance between the electronic device 101 and the user. The electronic device 101 may control an object, that is, a size of characters within a screen 2420 according to the second distance d2 and, in this case, enlarge the object to be larger than the object corresponding to the first distance d1 and display the enlarged object. Accordingly, the electronic device 101 according to various embodiments of the present disclosure may adaptively configure and display the screen according the distance from the user.

Meanwhile, according to another embodiment, the electronic device 101 may determine an output level based on the distance between the electronic device 101 and the user. The output level may include a size of a voice, which the electronic device 101 can output, and brightness of the screen. For example, the electronic device 101 may increase the size of the output voice or the brightness of the screen as the distance to the user is farther.

Figure 25:
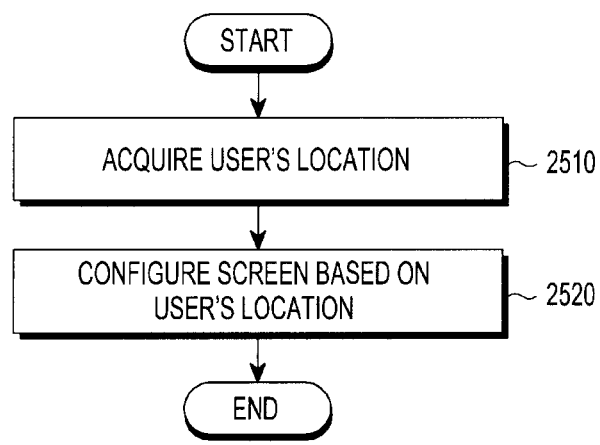
FIG. 25 is a flowchart illustrating a control method of the electronic device according to various embodiments of the present disclosure.
Figure 26A:
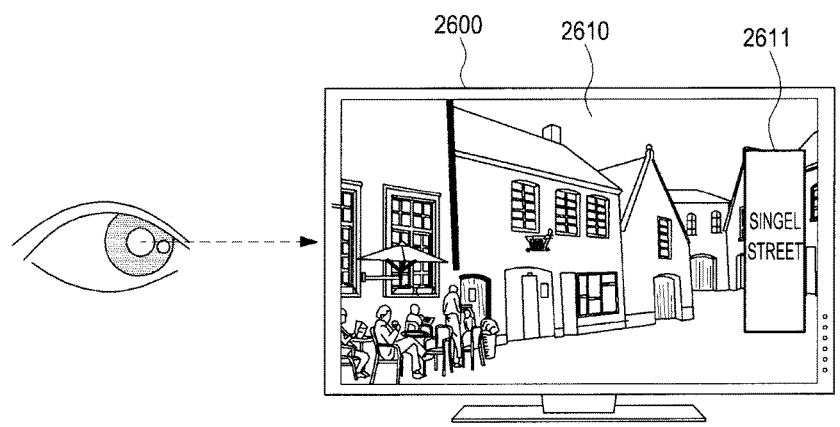
FIG. 26A and FIG. 26B are conceptual diagrams of a TV type electronic device according to various embodiments of the present disclosure.
Figure 26B:
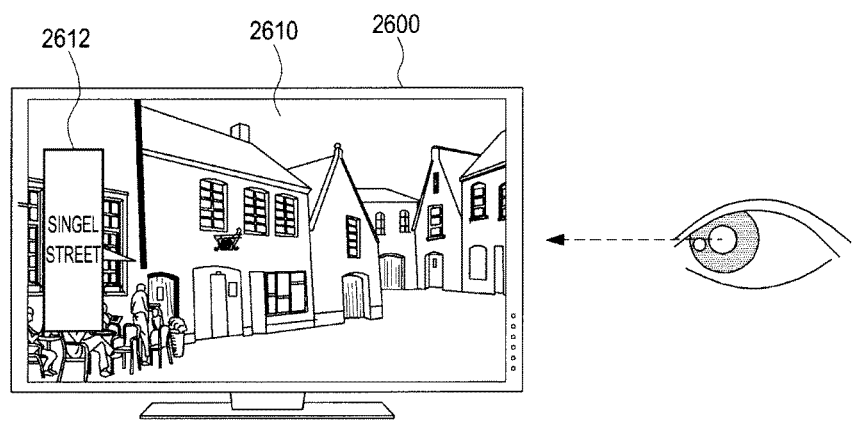

FIG. 25 is a flowchart illustrating a control method of the electronic device according to various embodiments of the present disclosure. The embodiment of FIG. 25 will be described in more detail with reference to FIGS. 26A and 26B. FIGS. 26A and 26B are conceptual diagrams of a TV type electronic device according to various embodiments of the present disclosure.

In operation 2510, an electronic device 2600 may acquire a user's location. As described above, the electronic device 2600 according to various embodiments of the present disclosure may acquire the user's location based on detection information from various devices such as the microphone, the touch panel, the proximity sensor, the camera, and the transducer. Meanwhile, as illustrated in FIGS. 26A and 26B, the electronic device 2600 may be implemented by a TV.

In operation 2520, the electronic device 2600 may configure and display a screen 2610 based on the user's location. For example, the electronic device 2600 may configure the screen 2610 based on the user's location. More specifically, the electronic device 2600 may determine a location of at least one object 2611 included in the screen 2610 based on the user' location. For example, referring to FIG. 26A, the electronic device 2600 may determine that the user is positioned relatively on the left of the electronic device 2600. The electronic device 2600 may display the object 2611 including characters or subtitles for describing a scene relatively on the right of the screen 2610 based on the user's location. Alternatively, referring to FIG. 26B, the electronic device 2600 may determine that the user is positioned relatively on the right of the electronic device 2600. The electronic device 2600 may display an object 2612 including characters or subtitles for describing a scene relatively on the left of the screen 2610 based on the user's location. As described above, the electronic device 2600 according to various embodiments of the present disclosure may control not only a display direction of the screen but also a location of a particular object within the screen based on the user's location.

According to various embodiments of the present disclosure, a method of controlling an electronic device may include: an operation of acquiring a user's location with respect to the electronic device; and an operation of determining a display direction of a screen displayed on the electronic device based on the acquired user's location and displaying a first screen in the determined display direction.

According to various embodiments of the present disclosure, the operation of acquiring the user's location with respect to the electronic device may include: an operation of detecting a voice from each of a plurality of microphones of the electronic device; and an operation of acquiring the user's location according to a detection time difference between the voices detected by the plurality of microphones.

According to various embodiments of the present disclosure, the operation of acquiring the user's location with respect to the electronic device may include: an operation of acquiring an electric signal from a touch panel of the electronic device; and an operation of acquiring the user's location based on the electric signal.

According to various embodiments of the present disclosure, the operation of acquiring the user's location based on the electric signal may include an operation of acquiring the user's location based on at least one of a pattern and a location of an area having a strength of the electric signal from the touch panel, which is weaker than a preset threshold.

According to various embodiments of the present disclosure, the operation of acquiring the user's location based on the electric signal may include an operation of acquiring the user's location based on an input position of the touch panel corresponding to the electric signal from the touch panel.

According to various embodiments of the present disclosure, the operation of acquiring the user's location with respect to the electronic device may include: an operation of detecting proximity information from each of a plurality of proximity sensors of the electronic device; and an operation of acquiring the user's location according to the proximity information detected by said each of the plurality of proximity sensors.

According to various embodiments of the present disclosure, the operation of acquiring the user's location with respect to the electronic device may include: an operation of generating transmission ultrasonic waves by using at least one transducer of the electronic device; and an operation of acquiring the user's location based on reflected ultrasonic waves measured by said at least one transducer.

According to various embodiments of the present disclosure, the operation of acquiring the user's location with respect to the electronic device may include: an operation of acquiring an image of one side of the electronic device; and an operation of analyzing the image and acquiring the user location based on a result of the analysis.

According to various embodiments of the present disclosure, the operation of determining the display direction of the screen displayed on the electronic device based on the acquired user's location and displaying of the first screen in the determined display direction may include: an operation of determining a first direction in which to beam-project the first screen based on the acquired user's location; and an operation of beam-projecting the first screen in the determined first direction.

According to various embodiments of the present disclosure, the operation of determining the display direction of the screen displayed on the electronic device based on the acquired user's location and displaying of the first screen in the determined display direction may include: an operation of determining a first area to be displayed on a display based on the acquired user's location; and an operation of displaying the first screen in the first area in the determined display direction.

According to various embodiments of the present disclosure, a method of controlling an electronic device may include: an operation of acquiring a distance between the electronic device and a user; an operation of determining at least one of a configuration of a screen displayed on the electronic device and an output level based on the acquired distance; and an operation of performing an output based on at least one of the determined configuration of the screen and the determined output level.

According to various embodiments of the present disclosure, a method of controlling an electronic device may include: an operation of acquiring a user's location with respect to the electronic device; and an operation of determining a display location of at least one object within a screen displayed on the electronic device based on the acquired user's location and displaying a first screen on which said at least one object is arranged at the determined display location.

According to various embodiments of the present disclosure, acquiring the user's location comprises determining an angle from a point on the electronic device and a reference.

Various embodiments of the present disclosure disclosed in this specification and the drawings are merely specific examples presented in order to easily describe technical details of the present disclosure and to help the understanding of the present disclosure, and are not intended to limit the scope of the present disclosure. Therefore, it should be construed that, in addition to the embodiments disclosed herein, all modifications and changes or modified and changed forms derived from the technical idea of various embodiments of the present disclosure fall within the scope of the present disclosure.

What is claimed is:

1. A method of controlling an electronic device, the method comprising:
   receiving an electric signal corresponding to a user input from a touch panel of the electronic device;
   determining a user's orientation relative to the electronic device;
   determining a display direction of a screen to be displayed on a display of the electronic device based on the determined user's orientation; and
   displaying the screen in the determined display direction,
   wherein determining the user's orientation relative to the electronic device further comprises:
      detecting a first voice from one of a plurality of microphones of the electronic device at a first detection time;
      detecting a second voice from another of the plurality of microphones of the electronic device at a second detection time; and
      determining the user's orientation according to a difference between the first detection time and the second detection time.

2. The method of claim 1, wherein the display direction includes at least one of a configuration, an arrangement, and a rotation information on an object in the screen.

3. The method of claim 1, wherein determining the user's orientation relative to the electronic device further comprises determining the user's orientation based on at least one of a pattern and a location of an area having a strength of the electric signal from the touch panel, which is weaker than a preset threshold.

4. The method of claim 1, wherein determining the user's orientation relative to the electronic device further comprises:
   detecting proximity information from each of a plurality of proximity sensors of the electronic device; and
   determining the user's orientation according to the proximity information detected by said each of the plurality of proximity sensors.

5. The method of claim 1, wherein determining the user's orientation relative to the electronic device further comprises:
   generating transmission ultrasonic waves by using at least one transducer of the electronic device; and
   determining the user's orientation based on reflected ultrasonic waves measured by said at least one transducer.

6. The method of claim 1, wherein determining the user's orientation relative to the electronic device further comprises:
   acquiring an image of one side of the electronic device;
   analyzing the image; and determining the user's orientation based on a result of analyzing.

7. The method of claim 1, wherein determining the display direction of the screen to be displayed on the display based on the determined user's orientation and the displaying of the screen in the determined display direction comprises:
   determining a first direction in which to beam-project the screen based on the determined user's orientation; and
   beam-projecting the screen in the determined first direction.

8. The method of claim 1, wherein determining the display direction of the screen to be displayed on the display based on the determined user's orientation and displaying the screen in the determined display direction comprises:
   determining a first area to be displayed on the display based on the determined user's orientation; and
   displaying the screen in the first area in the determined display direction.

9. The method of claim 1, wherein determining the user's orientation relative to the electronic device further comprises determining an angle from a point on the electronic device and a reference.

10. An electronic device comprising:
   a display including a touch panel;
   a processor electrically connected to the display;
   a plurality of microphones, one of which detects a first voice at a first detection time and another one of which detects a second voice at a second detection time, the microphones being electrically connected to the processor; and
   a memory electrically connected to the processor,
   wherein the memory is further configured to store instructions that, when executed, cause the processor to:
      receive an electric signal corresponding to a user input from the touch panel,
      determine a user's orientation relative to the electronic device based on a difference between the first detection time and the second detection time,
      determine a display direction of a screen to be displayed on the display based on the determined user's orientation, and
      control the display to display the screen in the determined display direction.

11. The electronic device of claim 10, wherein the display direction includes at least one of a configuration, an arrangement, and a rotation information on an object in the screen.

12. The electronic device of claim 10, wherein the memory is further configured to store instructions that, when executed, cause the processor to:
   determine the user's orientation based on at least one of a pattern and a location of an area having a strength of the electric signal from the touch panel, which is weaker than a preset threshold.

13. The electronic device of claim 10, further comprising a plurality of proximity sensors, each of which detects proximity information, the proximity sensors being electrically connected to the processor,
   wherein the memory is further configured to store instructions that, when executed, cause the processor to:
   determine the user's orientation according to the proximity information detected by each of the plurality of proximity sensors.

14. The electronic device of claim 10, further comprising at least one transducer configured to generate transmission ultrasonic waves and receive returning ultrasonic waves formed by a reflection of the transmission ultrasonic waves,
   wherein the memory is further configured to store instructions that, when executed, cause the processor to:
   determine the user's orientation based on the reflected ultrasonic waves.

15. The electronic device of claim 10, further comprising a camera configured to acquire an image of one side of the electronic device,
   wherein the memory is further configured to store instructions that, when executed, cause the processor to:
   analyze the image, and
   determine the user's orientation based on a result of analysis.

16. An electronic device comprising:
   a plurality of displays;
   at least one touch panel;
   a processor electrically connected to the displays;
   a plurality of microphones, one of which detects a first voice at a first detection time and another one of which detects a second voice at a second detection time, the microphones being electrically connected to the processor; and
   a memory electrically connected to the processor,
   wherein the memory is further configured to store instructions that, when executed, cause the processor to:
      receive an electric signal corresponding to a user input from the at least one touch panel,
      determine a user's orientation relative to the electronic device based on a difference between the first detection time and the second detection time,
      determine a first display to display a first screen among the plurality of displays based on the determined user's orientation, and
      control the determined first display to display the first screen.

* * * * *